United States Patent
Ross et al.

(10) Patent No.: US 11,100,760 B1
(45) Date of Patent: Aug. 24, 2021

(54) SYSTEM AND METHOD FOR GENERATION AND VALIDATION OF MULTIGAME WITH BONUS GAME USING AN ELECTRONIC CARD

(71) Applicant: SCA Promotions, Dallas, TX (US)

(72) Inventors: Jay B. Ross, Delran, NJ (US); Robert D. Hamman, Dallas, TX (US)

(73) Assignee: SCA PROMOTIONS, Dallas, TX (US)

( * ) Notice: Subject to any disclaimer, the term of this patent is extended or adjusted under 35 U.S.C. 154(b) by 0 days.

(21) Appl. No.: 17/168,855

(22) Filed: Feb. 5, 2021

(51) Int. Cl.
| | |
|---|---|
| G07F 17/32 | (2006.01) |
| H04L 9/14 | (2006.01) |
| G06F 11/10 | (2006.01) |
| H04W 4/80 | (2018.01) |

(52) U.S. Cl.
CPC ........ *G07F 17/329* (2013.01); *G06F 11/1004* (2013.01); *G07F 17/3218* (2013.01); *G07F 17/3241* (2013.01); *G07F 17/3267* (2013.01); *H04L 9/14* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 9,911,274 B2 | 3/2018 | Shenker et al. | |
| 10,296,295 B1* | 5/2019 | Jackson | G06F 7/588 |
| 10,360,577 B2 | 7/2019 | Shenker et al. | |
| 10,366,564 B1* | 7/2019 | Wentker | G06K 19/06037 |
| 10,593,153 B2 | 3/2020 | Shenker et al. | |
| 10,789,808 B1* | 9/2020 | Lindelsee | G07F 7/0893 |
| 2014/0274314 A1* | 9/2014 | Cage | G07F 17/3255 463/25 |
| 2018/0151026 A1* | 5/2018 | Shenker | G07F 17/329 |

* cited by examiner

*Primary Examiner* — Jason T Yen
(74) *Attorney, Agent, or Firm* — Meagher Emanuel Laks Goldberg & Liao, LLP.

(57) ABSTRACT

According to various embodiments, a method for implementing a multigame is disclosed. The method includes randomly generating a plurality of game outcomes for the multigame. The method further includes grouping the plurality of game outcomes into a plurality of batches according to a game specification and assigning a batch number to each of the plurality of batches. The method also includes encoding each batch number with a security code. The method further includes electronically storing each encoded batch number in a respective game card, where each game card is configured to wirelessly communicate the encoded batch number to a user computing device. The method also includes providing a game application for downloading by the user computing device, where the application is configured to provide a gaming display on the user computing device to allow for playing the multigame based on the encoded batch number.

19 Claims, 28 Drawing Sheets

(130)

| Number of ePullTab Games | 10,800,000 |
| --- | --- |
| Pools | 50 |
| Pool Size | 216,000 |
| Cost per ePullTab Game | $2.00 |

Prize Schedule

| Prize | Total Available | Prize per Pool | Token # |
| --- | --- | --- | --- |
| 5,000 | 52 | - | - |
| 600 | 3,297 | - | - |
| 50 | 21,094 | 421 | 4 |
| 10 | 168,750 | 3375 | 3 |
| 2 | 1,112,366 | 22,247 | 2 |
| 1 | 3,337,097 | 66,741 | 1 |
| - | 6,159,353 | 123,146 | 0 |

Bonus Schedule

| Prize | Multiplier | Total Available | Prize per Pool | Token # |
| --- | --- | --- | --- | --- |
| 5,000 | 200 | 1 | - | 12 |
| 5,000 | 20 | 2 | - | 11 |
| 5,000 | 2 | 6 | - | 10 |
| 5,000 | 1 | 43 | - | 9 |
| 600 | 200 | 33 | - | 8 |
| 600 | 20 | 100 | 2 | 7 |
| 600 | 2 | 400 | 8 | 6 |
| 600 | 1 | 2764 | 55 | 5 |

| Card Distribution | Card Value | Total Available | # per Pool |
|---|---|---|---|
| | 200 | 15,000 | 300 |
| | 100 | 20,000 | 400 |
| | 40 | 200,000 | 4000 |
| | 20 | 350,000 | 7000 |
| | 10 | 160,000 | 3200 |

Lottery Department
Lottery Game AB008439

Section 1 - PURPOSE OF RULES
These game specific rules are issued pursuant to State Code and are intended to specify only details and restrictions applicable to a particular pull-tab game as opposed to pull-tab games in general. These game specific rules expressly incorporate the State Lottery's administrative rules, which appear in the State Administrative Code. Except for administrative rules relating to the Lottery's responsibility for invalid or defective tickets, in the event of inconsistency, these game specific rules control any contrary administrative code provisions.

Section 2- EFFECTIVE DATE
These rules become effective on April 22, 2019 and will remain effective until modified or rescinded by the State Lottery Authority CEO.

Section 3 - DEFINITIONS OF WORDS AND PHRASES USED IN THESE RULES
3.1 "Ticket" means a Pull-tab Game #95 electronic multigame card.
3.2 "Play Symbols" consist of pictures of a Triple Bar, Bar, Cherry, Lucky 7, Bell, and Dollar Sign. Specific combinations of these symbols appear under each tab on the back of the ticket. Tickets winning the jackpot prize will have 3 Triple Bar symbols printed horizontally across 1 entire pull-tab window with the jackpot amount won printed perpendicular to the 3 Triple Bar play symbols in the far left side of the single pull-tab window with an arrow over the top of the 3 Triple Bar prize symbols. Jackpot prize amounts are won with 3 Triple Bar symbols and arrow in the same pull-tab window, and all other prizes are won with 3 winning symbol combinations printed horizontally and connected with an arrow for each winning combination. On tickets that win an amount other than the jackpot prize, the total amount won will also appear in black on the far left but on the lower most winning arrowhead tab showing the total dollar amount the ticket pays.
3.3 "Unit" means a shrink-wrapped "sleeve" of pull-tab ecards containing 540 tickets.
3.4 "Carton" means a box containing four units of pull-tab tickets.
3.5 "Game" means a single outcome stored on the ticket.

Section 4 - DETERMINATION OF WINNING TICKET
"Karat Cakes" is played by revealing the five tabs located on the front of the ticket. Check all five tab areas. If a player reveals the top jackpot amount printed alongside the JACKPOT winning symbol with an arrow through it within a single window tab, the player must claim their top jackpot prize directly from a Lottery office. All other winning tickets shall be paid by the retailer who sold the player the ticket. Three symbols are printed under each tab. If three consecutive symbols printed vertically or diagonally under any of the tabs match identically any of the winning combinations as shown on the ticket front, the player wins the corresponding prize. Winning tickets paid by the retailer may contain multiple winners. Winning tickets have an arrow connecting each winning combination and a prize code printed in black on the far left of the lower most winning arrowhead tab showing the total dollar amount the ticket pays. If a player reveals 3 Triple Bar symbols and its corresponding arrow in a single window tab, they win the $5,000 prize. Return the ticket to the player along with the claim form to claim at a Lottery office.

Figure 21(a)

The prize amounts are as follows: 

| | |
|---|---|
| 3 Triple Bar | $5,000.00 |
| 3 Bar | $600.00 |
| 3 Cherry | $50.00 |
| 3 Lucky 7 | $10.00 |
| 3 Bell | $2.00 |
| 3 Dollar Sign | $1.00 |

Section 5 - NUMBER AND VALUES OF PRIZES PER UNIT OF TICKETS
Prize Number of Winners Prize Payout

| Prize | Multiplier | Prize Payout | Total Available | Prize | Multiplier | Prize Payout | Total Available |
|---|---|---|---|---|---|---|---|
| $5,000 | 200 | $1,000,000 | 1 | $600 | 2 | $1,200 | 400 |
| $5,000 | 20 | $100,000 | 2 | $600 | 1 | $600 | 2764 |
| $5,000 | 2 | $10,000 | 6 | $50 | -- | $50 | 21,094 |
| $5,000 | 1 | $5,000 | 43 | $10 | -- | $10 | 168,750 |
| $600 | 200 | $120,000 | 33 | $2 | -- | $2 | 1,112,366 |
| $600 | 20 | $12,000 | 100 | $1 | -- | $1 | 3,337,097 |
| | | | | No Win | -- | -- | 6,159,353 |

Section 6 - VALIDATION REQUIREMENTS
A. Each winning ticket that does not have 3 Triple Bar symbols, will have a prize code printed in black on the far left of the lower most winning arrowhead tab showing the total dollar amount the ticket pays.
B. After the player has signed their ticket, verify that the winning ticket was sold at your location by swiping the barcode through the barcode reader.
C. Pay the amount indicated by the prize code, with the exception of the $3,000.00 prizes. Players must claim $3,000.00 jackpot prizes by bringing their original ticket and a claim form to any Lottery office.
D. Destroy the prize code before disposing of the ticket unless it is a $3,000 JACKPOT prize winner.

Section 7 - PRICE
The price of a Pull-Tab Game # A8008439 Ticket is $2.00.

Section 8 - CLAIMS AND TICKET RESPONSIBILITY
8.1 All prizes, except a $3,000.00 jackpot prize, must be claimed at the place of business of the retailer, which sold the ticket. If a player wins a $3,000.00 prize, the player must retain their ticket to claim the $3,000.00 prize at any Lottery office.
8.2 A pull-tab ticket is a bearer instrument until signed on the back by the owner.
8.3 If a defective ticket is purchased, the only responsibility or liability of the CEO shall be the replacement of the defective ticket with an unplayed ticket from the same game or any other game, or a refund of the sale price of the ticket. By purchasing or obtaining a ticket, a player agrees to the terms of these rules, including but not limited to the limitation of remedy for an invalid or defective ticket.

Figure 21(b)

SYSTEM AND METHOD FOR GENERATION AND VALIDATION OF MULTIGAME WITH BONUS GAME USING AN ELECTRONIC CARD

FIELD OF THE INVENTION

The present invention relates generally to games of chance and, more particularly, to a gaming system and method for providing electronic tickets that encode tally counts of predetermined game results stored in non-volatile memory, found within the electronic ticket.

BACKGROUND OF THE INVENTION

The gaming and lottery industries have enjoyed a steady increase in popularity over time. This increase has produced a competitive marketplace for instant win type games of chance.

FIG. 1 is an example of a prior art instant win pull tab ticket game system. A game specification 7 and a set of game rules (not shown) define the characteristics of the pull tab ticket game. The lottery office 3 coordinates the printing and distribution of the pull tab tickets to the authorized retailers 4. A game player 5 can purchase one or more pull tab tickets 6 from one or more lottery retailers 4. The pull tab ticket purchased by the player 5 is manufactured by the Game Card Manufacturer facility 1 and distributed to the authorized lottery retailers 4 via the main lottery office 3.

Depending on hidden indicia revealed on the pull tab ticket 6, the following options are available to the player 5:

(A) There is no winner amount. There is no further action required by the player.

(B) The player has won a monetary prize below a specific threshold (the state lottery commission sets this threshold) and is able to "cash in" the scratch off ticket at a lottery retailer 4.

(C) The player has won a monetary prize above the specific threshold. The player can mail in a claim form with their winning ticket to the lottery office 3 to receive the monetary prize or directly visit the lottery office 3 and "cash in" a winning pull tab ticket 6.

While pull tab tickets 6 typically allow a player 5 the opportunity to win multiple times on a ticket, this approach can lead to limited game play, requires a specialized printing process, adds additional expenses to produce a pull tab ticket, and uses what some would consider antiquated "paper" technology.

U.S. Pat. No. 9,911,274 discloses a secure distributed gambling system which includes a plurality of secure gambling microprocessors. The system disclosed requires the gambling microprocessors to contain a Random Number Generator and Cryptographic Coprocessor for security purposes. Furthermore, the system requires communications between the gambling microprocessors to support bidirectional communications between itself and the plurality of mobile devices.

U.S. Pat. No. 10,360,577 discloses a system for coupons to be electronically distributed to mobile devices. The disclosed system requires the mobile device to be within a broadcast range for each gaming session. The system also requires the coupon generating system to have a random number generator for the generation of the result of the gaming session.

U.S. Pat. No. 10,366,564 discloses a gaming system that allows users to participate in draw games utilizing a portable microprocessor, a mobile device, and a game server. The gaming system requires bi-directional encrypted communication between the portable microprocessor and mobile device and between the mobile device and game server for each wager increasing the circuit complexity required on the portable microprocessor.

U.S. Pat. No. 10,593,153 discloses a system which allows a consumer to play a plurality of predetermined instant tickets stored onto a memory of a microprocessor. The system requires the storage of a validation number, outcome, and value of each predetermined instant ticket. This leads to a requirement of a large amount of memory storage. The system also requires bidirectional communication between the microprocessor and the computing device for each predetermined instant ticket played.

As such, there is a need for a predetermined multigame system that can contain a higher number of game outcomes on an inexpensive, easy to produce game ticket where the game play is transposed into electronic memory for a more interactive experience, especially with instant win type games. Users could download software applications onto smart devices, effectively allowing them to be a personal gaming device. With the abundance of "smart" communication devices, such as the Apple or Android smart devices, it can be possible to communicate with an electronic card via communications protocols such as Bluetooth, Near-Field-Communication (NFC), ZIGBEE, or direct wire or wireless communications generally and the internet to lookup or download information associated with the instant game on the smart device.

A key element when matching a smart device to an instant win ticket is the ability to represent the predetermined outcomes of a game with limited memory storage on the electronic card. Error control and verifiability are also desirable attributes of the information placed on the printed ticket.

SUMMARY OF THE INVENTION

According to various embodiments, a method for implementing a multigame is disclosed. The method includes randomly generating a plurality of game outcomes for the multigame. The method further includes grouping the plurality of game outcomes into a plurality of batches according to a game specification and assigning a batch number to each of the plurality of batches. The method also includes encoding each batch number with a security code. The method further includes electronically storing each encoded batch number in a respective game card, where each game card is configured to wirelessly communicate the encoded batch number to a user computing device. The method also includes providing a game application for downloading by the user computing device, where the application is configured to provide a gaming display on the user computing device to allow for playing the multigame based on the encoded batch number.

According to various embodiments, an electronic game card for playing a multigame is disclosed. The electronic game card includes an electronic memory configured to store an encoded batch number corresponding to one of a plurality of batches of randomly generated game outcomes for the multigame according to a game specification. The electronic game card further includes a device for wireless communication configured to wirelessly communicate the encoded batch number to a user computing device having a downloaded game application that provides a gaming display to allow for playing the multigame based on the encoded batch number.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which:

FIG. 4(a) depicts a sample of predetermined ePullTab multigame parameter values according to an embodiment of the present invention;

FIG. 4(b) depicts a sample of predetermined ePullTab multigame parameter values according to an embodiment of the present invention;

FIG. 4(c) depicts a sample of predetermined ePullTab multigame parameter values according to an embodiment of the present invention;

FIG. 4(d) depicts a sample of predetermined ePullTab multigame parameter values according to an embodiment of the present invention;

FIG. 21(a) depicts a first part of an example of game rules according to an embodiment of the present invention;

FIG. 21(b) depicts a second part of an example of game rules according to an embodiment of the present invention

DETAILED DESCRIPTION OF THE INVENTION

Figure 1:
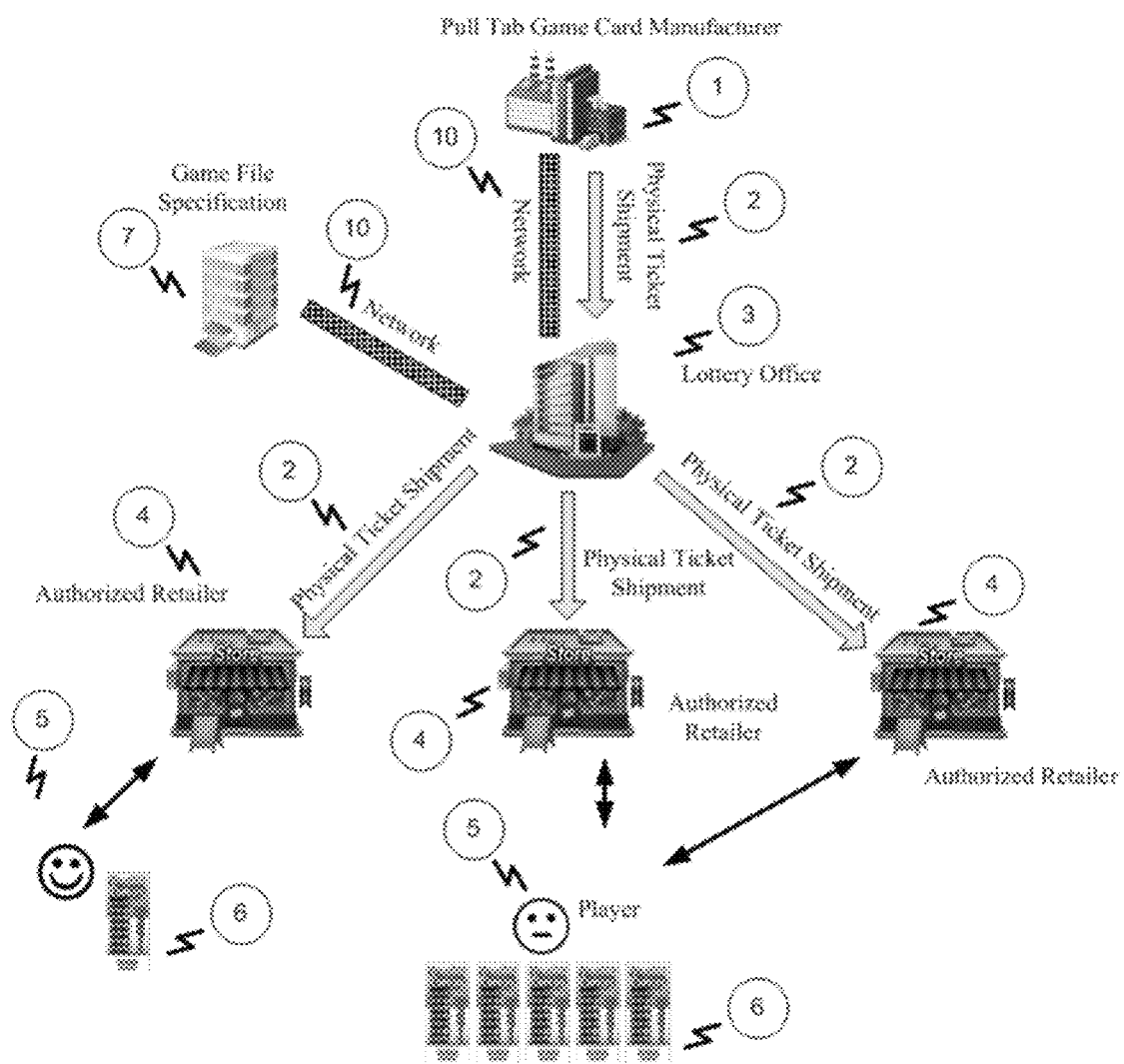
FIG. 1 depicts a diagram of a prior art pull tab game system.

Generally disclosed herein are embodiments for a gaming system and method for generating and playing predetermined multigame electronic cards (i.e. an electronic card containing multiple games or multiple rounds of a single type of game). The player "pairs" the electronic card to their smart device and plays the encoded multigames using an internet downloaded software application program.

Embodiments of the present invention preserve the advantages of the prior art approaches for the production and playing of multigame tickets while providing for a denser storage capability of predetermined outcomes using electronic communication techniques, as well as providing for a security system and method for ticket verification.

The denser storage capability is provided by generating and batching predetermined game outcomes, determining the number of each type of outcome in a batch and storing the tally count on an electronic card containing electronic memory.

The predetermined outcomes are generated using outcome results from specification tables and a random number generator. The predetermined outcomes are shuffled and batched into subgroups. The size of a subgroup is defined in the predefined game rules. A security code is generated for each batch of predetermined outcomes. The batch sequence number is encoded into the security code and stored in a secure database for the eventual ticket verification process.

Each subgroup of predetermined outcomes is analyzed to determine the total number of each outcome type as defined in the game specifications. The number of each outcome is stored on the electronic card as a tally count, which will be used by the software application program during game play.

Embodiments of the present invention create a game specification specifying a game series code number, a total number of tickets, a total number of prize pools (i.e., groups of outcomes), a total number of prize tiers, a number of prizes for each prize tier based on odds, an amount awarded for each prize level, play symbols, a winning combination for each prize level, a number of electronic cards at specified denominations, and a cost per game outcome. The game specification can be created at a lottery office or offsite via a secure network. Game rules are developed based on the game specification. A smart device (user device) application is also developed based on the game specification and game rules.

Embodiments of the present invention determine game outcomes by determining which prize pools will contain the prizes with less than 1 per pool. An array is created with a number of elements which are the number of prize pools. The array is then shuffled. A specified number of elements are selected based on prizes available to represent which prize pool will contain an associated prize outcome. The prize pools are populated with the number of prize pools. The array is again shuffled. A specified number of elements are again selected based on prizes available to represent which prize pool will contain associated prize outcomes. Prize pools are then populated, where each prize pool is an array with a specified number of elements and initialized to zero. It is then determined if the prize pool should contain a top tier prize where the zeros are overwritten with prize tokens for each prize tier. Each prize pool is shuffled (for instance with a Durstenfeld Shuffle) for randomization using a hardware random number generator that incorporates a bit mask modulus function to eliminate truncation bias. The prize pool array is stored in a master database to be used later when initializing the electronic game cards.

Embodiments of the present invention create game batches and initialize a plurality of electronic game cards. The prize pool array is loaded from a master database. An array is created with a number of elements based on the number of prize tiers. Another array is created with a number of elements to match the number of outcomes associated with an electronic card. Each type of game outcome is tallied and stored in the first array. The game card is then initialized by generating a batch ID associated with the current array of outcomes. The batch ID is encoded using for instance a symmetrical encryption/decryption algorithm. The encoded batch ID is then loaded on the electronic card. Further loaded on the electronic card are the game series code, the outcome count, and the prize tallies are also loaded on the game card. The prize tallies are encoded prior to loading to mask the count. The total winning amount associated with game outcomes on an electronic card and a load error-detecting code are calculated and loaded on the electronic card as well. The electronic card is then set to initialized. All batch information is stored in a master database for later retrieval for validation.

Embodiments of the present invention develop a smart device application based on the specification and rules. The application is previously downloaded and installed by a user prior to electronic card communication. The application could be configured based on a single game (different application for each game), a game type (same application but different graphics), or a single application for all games (different graphics and user interactions based on game type). The user device via the application would wireless communicate with the electronic card via near field communication, for instance. The communication can be uni-directional (simplex) or bi-directional (duplex). This wireless communication only needs to occur once. Wireless communication with the lottery office can also occur via internet through WiFi (local) network or a mobile data network. All game parameters associated with a game series ID would be downloaded including but not limited to game symbols, win amounts for each prize tier or token number, and winning combinations for each prize tier. Electronic card information would also be downloaded such as a random number associated with a lookup table to decode prize tallies. Once downloads are completed game play can be offline. The application creates, populates, and shuffles an outcome array where the length of the array equals the number of outcomes associated with an electronic card. The prize tally is also encoded. A Durstenfeld Shuffle can be used for the shuffle. The application calculates and displays the play card based on game parameters downloaded and game outcomes. The user then interacts with the play card to display game outcomes. The outcomes can be played multiple times on multiple devices with no change to the payout.

Embodiments of the present invention cash out an electronic card where winnings are based on the electronic card rather than per game on the card. The electronic card is returned to the lottery retailer for cash out payment. If under a specified amount in the rules, the amount may be paid by a lottery retailer; otherwise, the amount must be paid by the lottery office. Outcomes doe not need to be played for the electronic card to be cashed out and the card can be recycled for reuse in a later game.

Important technical advantages of certain embodiments of the present invention include generating batched game predetermined outcomes, generating security codes, generating tally counts, and encoding the tally counts and security codes. Compared to U.S. Pat. No. 9,911,274, embodiments of the disclosed system utilize simplified encoding techniques and simplex communication thus eliminating the need for the complex circuitry on the gambling microprocessor. Compared to U.S. Pat. No. 10,360,577, embodiments of the disclosed system advantageously use predetermined outcomes which reduce the requirements of circuitry found on the multigame eCard. Further, the embodiments only require simplex communication with the mobile devices once, which provides for an enhanced gaming experience. Compared to U.S. Pat. No. 10,366,564, embodiments of the disclosed system utilize predetermined outcomes and a simplified communication technique to reduce the circuit complexity along with operational costs. Compared to U.S. Pat. No. 10,593,153, embodiments of the disclosed system utilize a technique of storing a "tally count" or summary of each type of predetermined outcome to achieve much high data compression leading to a largely reduced requirement of memory storage. Further cost reduction is achieved by utilizing a communication technique which uses a one-time only, simplex communication scheme.

Additional technical advantages of embodiments of the present invention will be readily apparent to one skilled in the art from the following figures, description, and claims. Moreover, while specific advantages have been enumerated above, various embodiments may include all, some, or none of the enumerated advantages. A PullTab type game is used as a nonlimiting example of how the method and system perform. However, any predetermined multigame can be used in conjunction with this system and method, such as Black Jack, Craps, and slot machines, as nonlimiting examples.

Figure 2A:
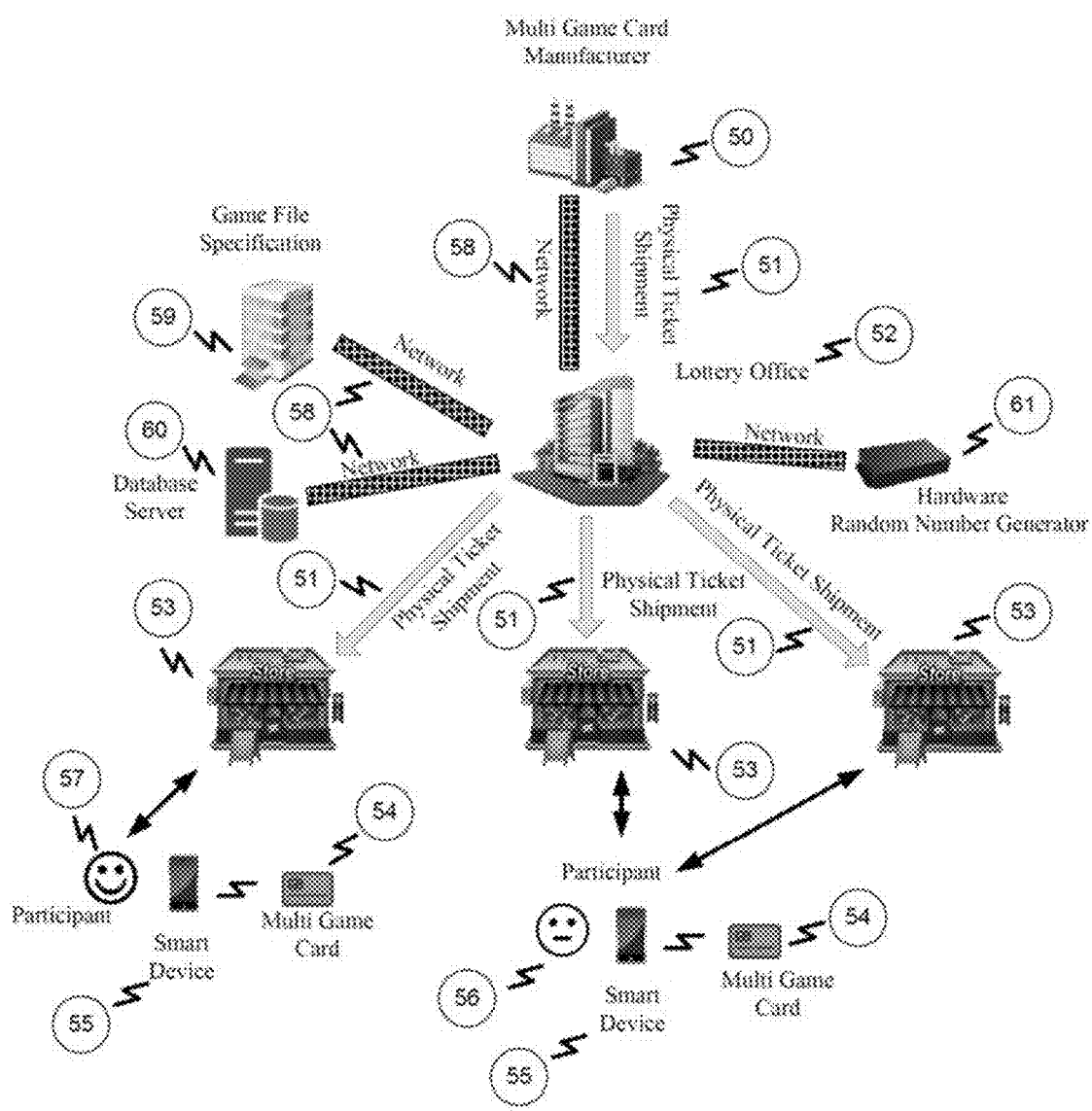
FIG. 2(a) depicts an overview diagram of a predetermined multigame ticket using an electronic card system according to an embodiment of the present invention.

FIG. 2(a) is a pictorial overview of a multigame system using multigame electronic cards ("eCards"). While FIG. 2(a) and subsequent figures may refer to the multigame system as "lottery" based, the reference to "lottery" is intended to be a nonlimiting example of a multigame system or method. A game specification 59 and the game rules (not shown) define the characteristics of the multigame eCard. The game specification 59 may be developed at a secure site external to the main multigame lottery office 52. Communication of the game specification may occur using a secure data network 58. The main lottery office 52 uses the game specifications 59 and game rules along with a hardware random number generator 61 to create and shuffle the game outcomes. The main lottery office 52 generates batches of the game outcomes as defined in the game specification file 59 and stores the batch information in a database server 60. The main lottery office 52 coordinates with the secure multigame electronic card manufacturing facility 50 to initialize the multigame eCards 54 with the batch information as stored in the database server 60. The main lottery office 52 may utilize a courier, a delivery service, or other means to physically distribute 51 the printed multigame eCards 54 to authorized retailers 53 (such as lottery retailers). Players 56, 57 can purchase the multigame game eCard 54 from any of the authorized retailers 53. Using a communications link such as Bluetooth or NFC, as nonlimiting examples, in their smart device 55, the player is able to display all the batch information stored on the eCard 54. Using a software application, the smart device 55 is able to display the batched predetermined game outcomes and determine the winning amount associated with the multigame eCard 54.

Figure 2B:
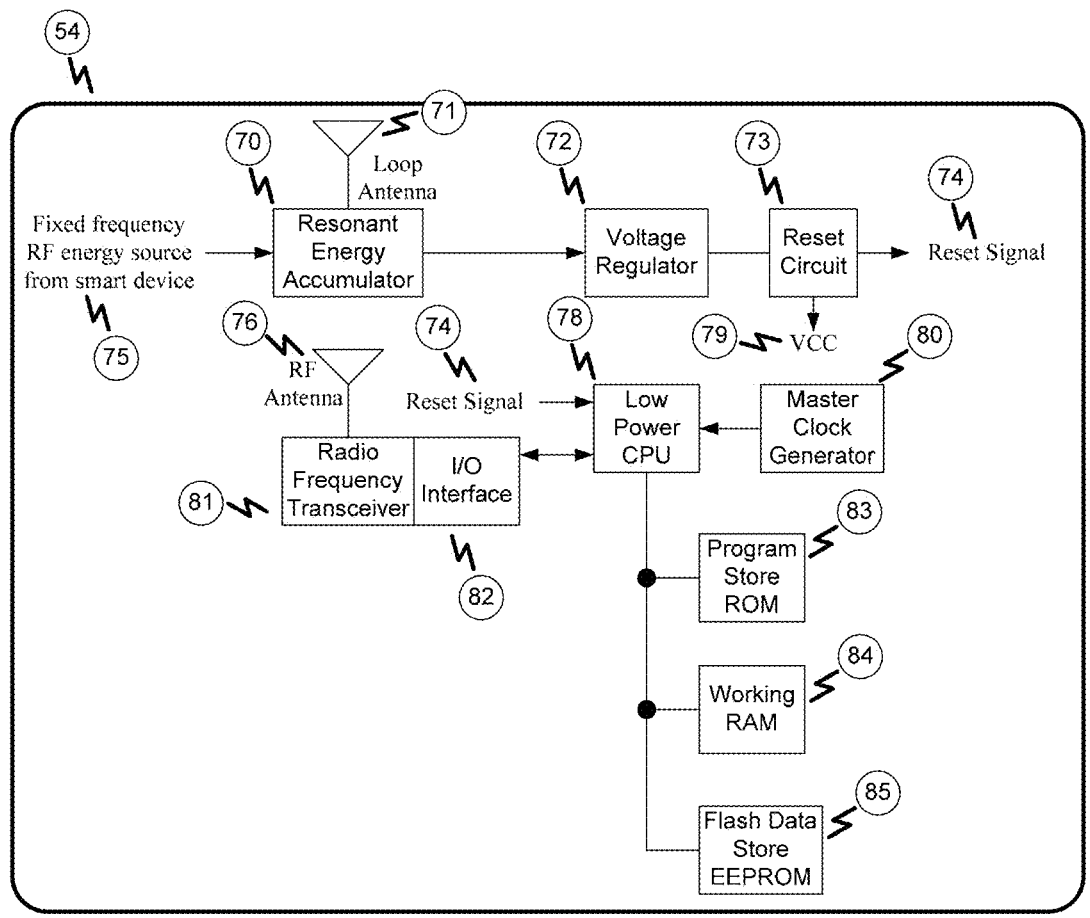
FIG. 2(b) depicts a multigame electronic card using near field communication (NFC) technology according to an embodiment of the present invention.

FIG. 2(b) is a schematic representation of an example of the architecture of a multigame electronic card 54 using non-limiting NFC technology. The resonant energy accumulator 70 captures a nearby smart device's radio frequency signal 75 via a loop antenna 71 to convert the signal into a power source. The voltage regulator 72 receives the unregulated power source signal and outputs a regulated voltage, VCC 79, for use by other circuit components. When VCC 79 is initially supplied, the reset circuit 73 generates a reset signal 74 to the low power CPU 78 which is then initialized and begins execution of the program stored in the program store ROM 83. The low power CPU 78 uses the working RAM 84 for temporary data storage while executing the program stored in the ROM 83. The flash data store EEPROM 85 is used to store data such as the multigame data structure. The data structure stored in the flash data EEPROM 85 includes 34 bytes of data representing the 8 byte Security ID Code, the 4 byte Game Series Code, a 1 byte Total Outcome Count, 13 bytes for Prize Tier Tally Counts, a 4 byte Total Win Amount, and a 4 byte CRC-32 Data Checksum. This data structure illustrates a non-limiting embodiment which describes a game with 13 prize tiers and a maximum of 255 outcomes supported per multigame eCard 54. With minimal increase to the Flash data store EEPROM 85 required, the data structure could be redefined to accommodate a larger or smaller number of prize tiers and by increasing the size of the Total Outcome Count the total outcomes per multigame eCard 54 could be increased substantially. The Master Clock Generator 80 generates a signal used by the CPU 78 to derive the data communications timing. The I/O Interface 82 includes circuitry that allows the multigame eCard 54 to communicate with the smart device via an NFC communication protocol. The radio frequency transceiver (or more simply a transmitter depending on the embodiment) 81 may share circuitry for both the transmission and reception of wireless data between the smart device and multigame eCard 54 via the RF Antenna 76. The transmission and reception of the wireless data can be simplex, half duplex, or full duplex depending on the complexity of the radio frequency transceiver.

Figure 3:
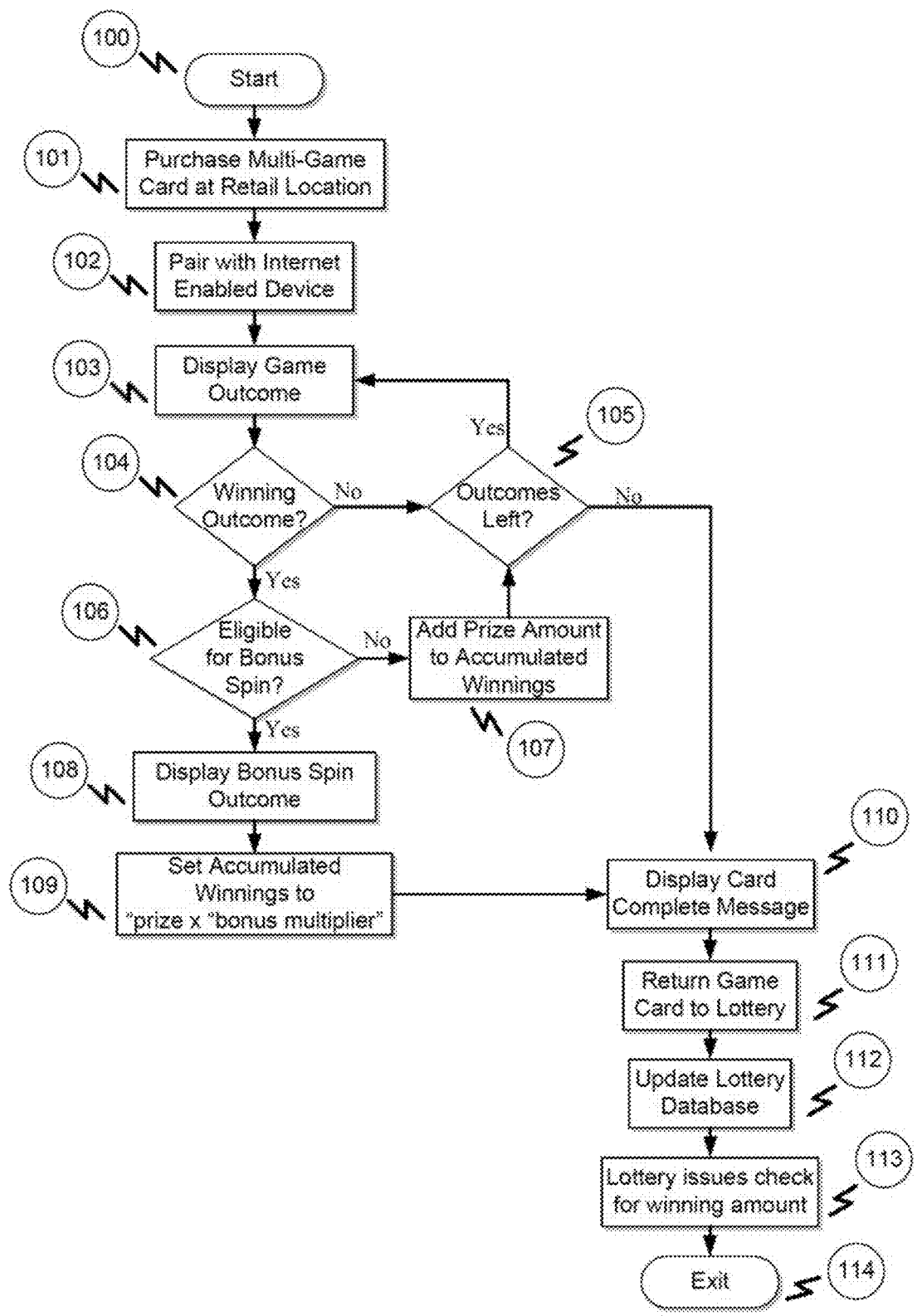
FIG. 3 depicts a flowchart of a predetermined multigame ePullTab system process according to an embodiment of the present invention.

FIG. 3 is a flow diagram representing a simplified overview of the life cycle for the multigame eCard. The flow diagram starts 100 after the eCard has been initialized and distributed to an authorized retailer. The player visits the authorized retailer and in step 101 purchases the multigame eCard at the price documented in the game rules. In step 102 the player "pairs" or associates the eCard to their smart device by initiating communications between the eCard and the smart device. The previously downloaded software application running on the smart device will retrieve the tally counts stored on the eCard and create and shuffle an array containing the specified amount of game outcomes (not shown). The application will then select the next game outcome in the array and create the game board for player interaction in step 103. If the software application requires downloading, the player will be prompted to download the application using a link stored in the electronic memory. Once the player has concluded interaction with the game outcome (game is finished), the software application determines if the outcome is a winner based on the game specifications in step 104.

If the outcome includes a winning combination, the software application moves to step 106 to determine if the winning combination is eligible for a bonus spin. If the combination is not eligible for the bonus spin, the application will add the prize amount to the accumulated winnings of the multigame eCard thus far in step 107. If the winning combination is eligible for a bonus spin, in step 108 the application will activate the bonus spin and display the results. In step 109, the application will set the accumulated winnings of the multigame eCard to the amount won by the bonus spin, the program then moves to step 110 where the application displays a "ticket complete" message. In step 105, if there is no winning outcome, the software application determines if there are game outcomes left to display. If there are, the program loops back to step 103.

If all game outcomes have been displayed, the software application proceeds to step 110 and displays a "ticket complete" message. The next step 111 is for the player to return the multigame eCard (if there is one or more winning outcomes). Dependent on the game rules, the player may return the eCard to an authorized retailer, return the ticket directly to the main lottery office, or redeem electronically (if permitted). Once the eCard has been returned, in step 112 the eCard information will be validated and the database will be updated to indicate the multigame eCard has been completed and retired. The final step 113 is for the player to receive the accumulated winning amount from the multigame. This could be in various forms such as but not limited to cash, check, or electronic transfer based on the game rules. The process completes in step 114.

FIG. 4(a) provides a game specification breakdown 130 for a sample ePullTab lottery game. There will be a total of 10,800,000 game outcomes created for the game. The predetermined game outcomes will be divided into 50 groups called "pools" containing 216,00 outcomes each. The cost per game as defined by game rules is $2.00 per game or outcome. The prize schedule 131 in FIG. 4(b) shows the individual prize counts for each base monetary prize tier. The bonus schedule 132 in FIG. 4(c) shows the individual prize counts for each multiplier level. From the total number of games and the tier level prize counts, the odds of each specific prize tier can be calculated. The eCard Distribution 133 in FIG. 4(d) shows the number and value of the eCards initialized. Based on the cost per ePullTab game and the Card Value, the total number of ePullTab games stored on the individual eCard can be calculated.

As seen in FIGS. 4(a)-(d), there are 13 possible winning outcomes. The 13 outcomes are "tokenized" (encoded) into a single 8-bit numeric value (byte). With just 13 of 256 possibilities used, there is an opportunity to add further winning possibilities to a game "hand".

Figure 5:
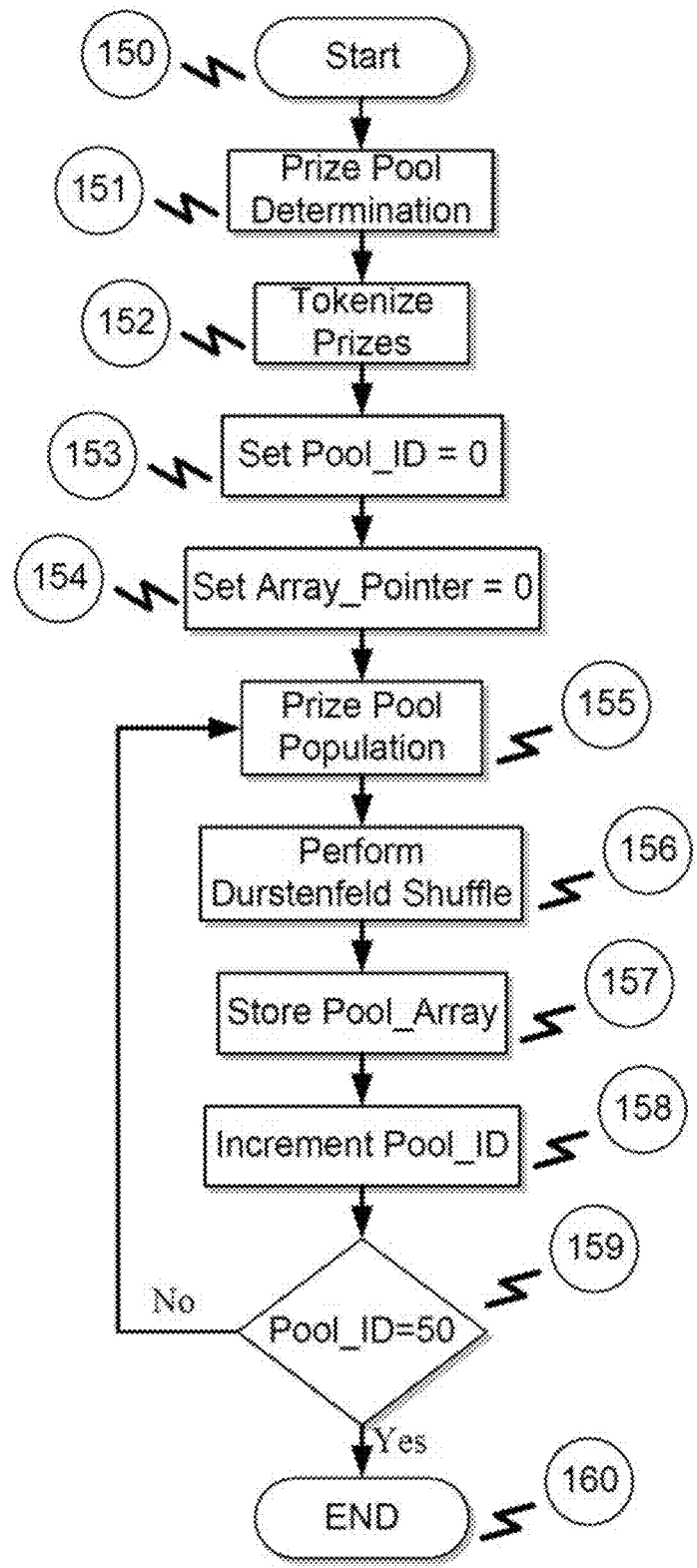
FIG. 5 depicts an overview flowchart of a prize pool population and shuffle according to an embodiment of the present invention.

FIG. 5 is a flowchart for the population and randomization of the fifty prize pool arrays. It should be noted this flowchart, as well as the following flowcharts, are based on the game specification example in FIG. 4 for the numbers used, and that aspect is not intended to be limiting. The function begins at "start" 150. The first step in the process is a software call to the Prize Pool Determination function in step 151. A table is loaded into the database's memory which assigns a token number to each prize level in step 152.

Variables called Pool_ID and Array_Pointer are respectively initialized to zero in steps 153, 154. The subfunction Prize Pool Population is called next in step 155. Once the prize pool array is populated with the appropriate prize tokens, another subfunction is called to perform a Durstenfeld Shuffle in step 156 to randomize the prize pool array. It should be noted while the Durstenfeld Shuffle is used in this embodiment, other embodiments can utilize alternative randomization approaches. When the randomization is completed, the prize pool array is stored in step 157 into the main database. The variable Pool_ID is incremented by one in step 158. The variable is then checked to see if it is equal to fifty in step 159, indicating if there are more prize pool arrays to populate and shuffle. If there are more arrays to populate, the method begins to populate the next array by returning to step 155, otherwise the method ends in step 160.

Figure 6:
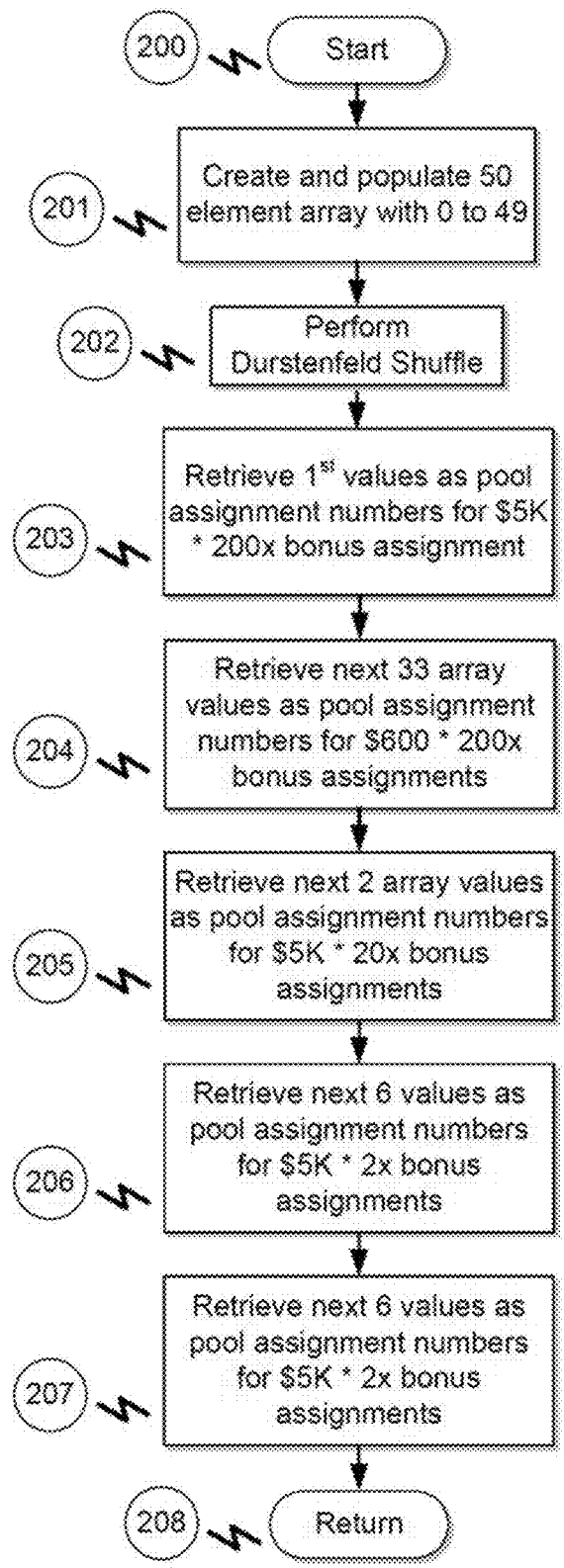
FIG. 6 depicts a flowchart of a prize pool determination according to an embodiment of the present invention.

FIG. 6 is a flowchart for the process used to determine which prize pools will contain the prizes, which are less than one per pool as defined in the game specifications. In this example, the prize determination method will determine which prize pool array will contain the token numbers for the $5000*200× multiplier (token #12), $5000*20× multiplier (token #11), $5000*2× multiplier (token #10), $5000*1× multiplier (token #9) and the $600*200× multiplier (token #8) prizes. The function enters at start 200 and creates a temporary array of 50 elements and populates the positions with values between 0 to 49, representing the 50 prize pool arrays in step 201. The method next performs a Durstenfeld Shuffle in step 202 to randomize the values of the array. As mentioned earlier, the Durstenfeld Shuffle is only one type of randomization approach and other approaches can be utilized in other embodiments. When the shuffle is completed, the first array element is retrieved in step 203 and will be used to indicate which prize pool will contain the token number for the prize of $5000*200× multiplier. The next 33 array elements are retrieved in step 204 and will be used to indicate which prize pools will contain the token number for the prize of $600*200× multiplier. The next 2 elements are retrieved in step 205, followed by the next 6 elements in step 206 and finally the next 6 elements are retrieved in step 207. These 14 elements will be used to indicate which prize pools will contain the token numbers for $5000*20× multiplier, $5000*2× multiplier and the $5000*1× multiplier, respectively. The function returns to the calling program in step 208.

Figure 7A:
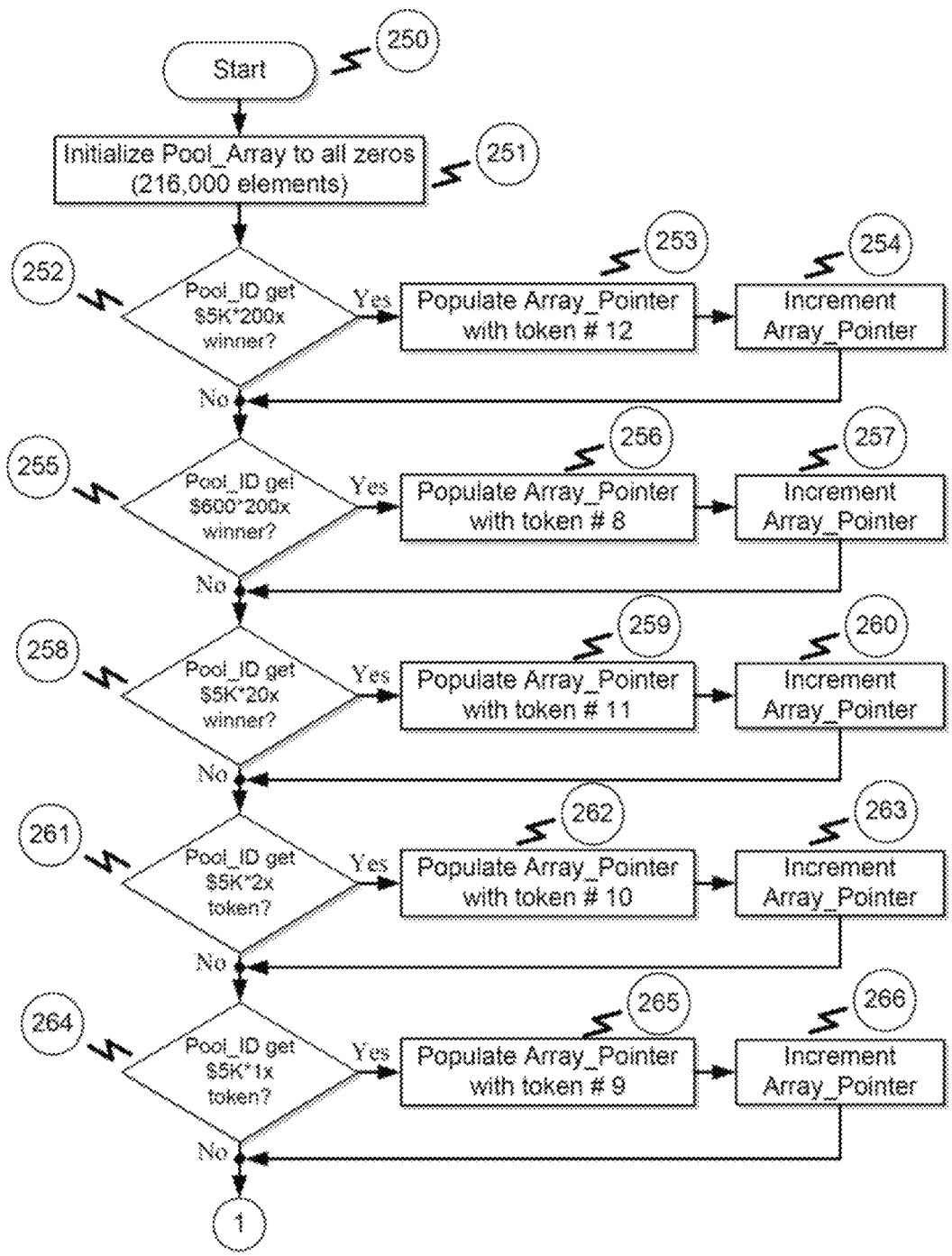
FIG. 7(a) depicts a first part of a flowchart of a prize pool population according to an embodiment of the present invention.
Figure 7B:
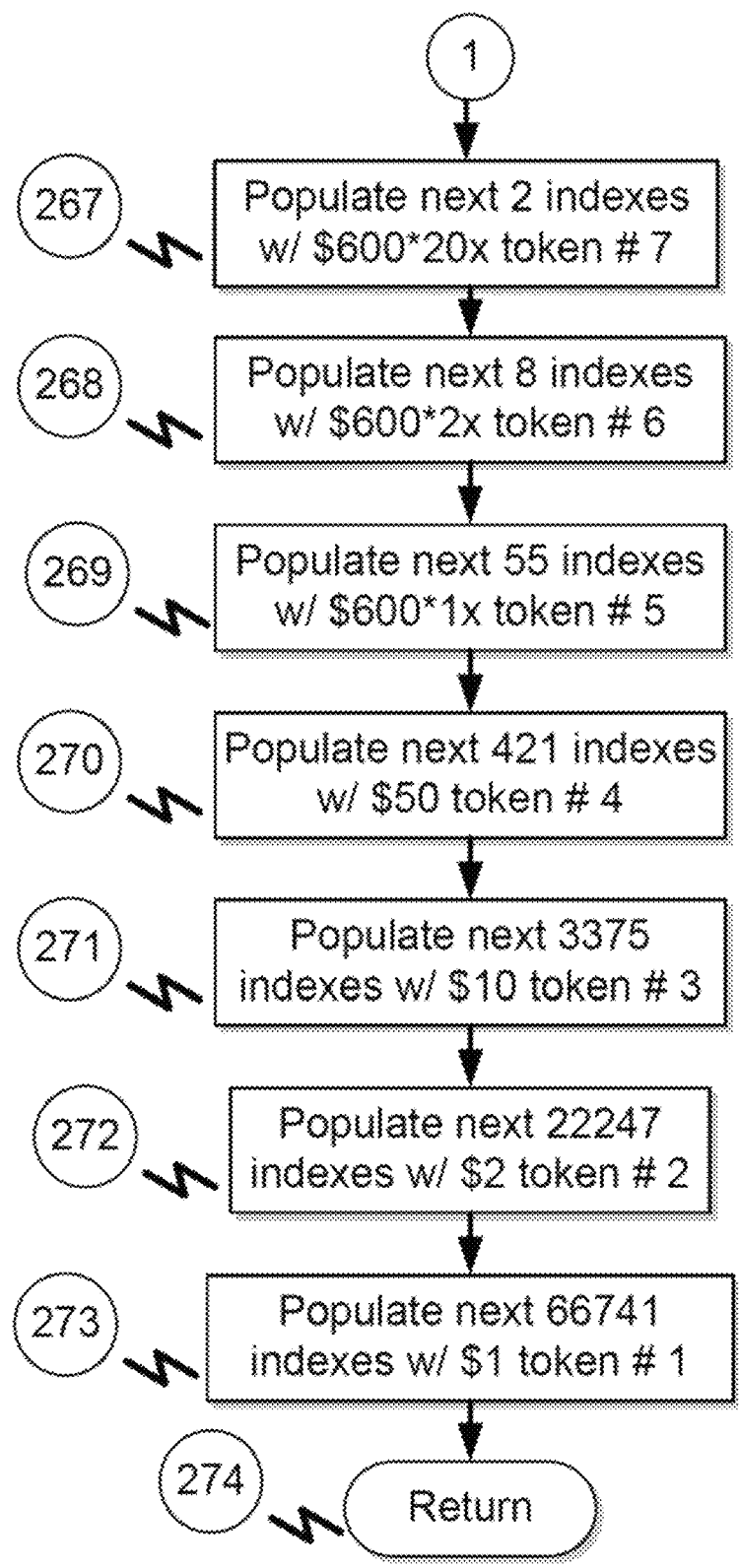
FIG. 7(b) depicts a second part of a flowchart of a prize pool population according to an embodiment of the present invention.

FIGS. 7(a) and 7(b) are flowcharts for the process which populates each of the 50 prize pool arrays with the tokens for the prizes available to win. The process starts at step 250 in FIG. 7(a). The process then begins by creating pool_array with 216,000 elements all assigned to zero in step 251, which is the token number for a non-winning game outcome. The process then checks if the Pool_ID variable (which is passed from the calling array) indicates this is a pool array which receives the token for a $5000*200× multiplier game in step 252. If yes, the method replaces the element in the pool array at the location of the array pointer with token #12 in step 253 before incrementing the array pointer in step 254. Next, the process checks to see if this pool_array will contain the token for a $600*200× winner in step 255. If yes, the method updates the current element to #8 in step 256 before incrementing the array pointer in step 257. In step 258 the process checks to see if the token for the $5000*20× prize should be included. If yes, the method updates the array value to #11 in step 259 before incrementing the array pointer in step 260. The process then checks if the $5000*2× token should be included in this pool array (Step 261). If yes, the process updates the array location with #10 in step 262 and increments the pointer in step 263. The process performs the last check for the prize token for the $5000*1× prize in step 264. If the token should be included, the array element is updated to #9 in step 265 and the array pointer is updated in step 266. Continuing in FIG. 7(b) there are two $600*20× winners per prize pool, the process populates the next index with token #7 in step 267. Not shown is the process of incrementing the array_pointer by the number of indexes updated, in this case the pointer is incremented by two. The next 8 indexes are populated with token #6 for the $600*2× winner in Step 268 and the array_pointer is incremented by 8 (also not shown). The next 55 indexes are populated with token #5 for the $600*1× winners in step 269 and the array_pointer is incremented by 55 (also not shown). The process populates the next 421 indexes with token #4 in step 270, increments the array_pointer (not shown) before populating the following 3375 indexes with token #3 in step 271. The process continues the population of the specified number of indexes in steps 272, and 273 of the array and incrementing of the array pointer (not shown) for each prize level. The remaining indexes in the pool_array have already been initialized to zero, which is the token number for non-winning game outcomes tickets. The method returns to the calling method in step 274.

Figure 8A:
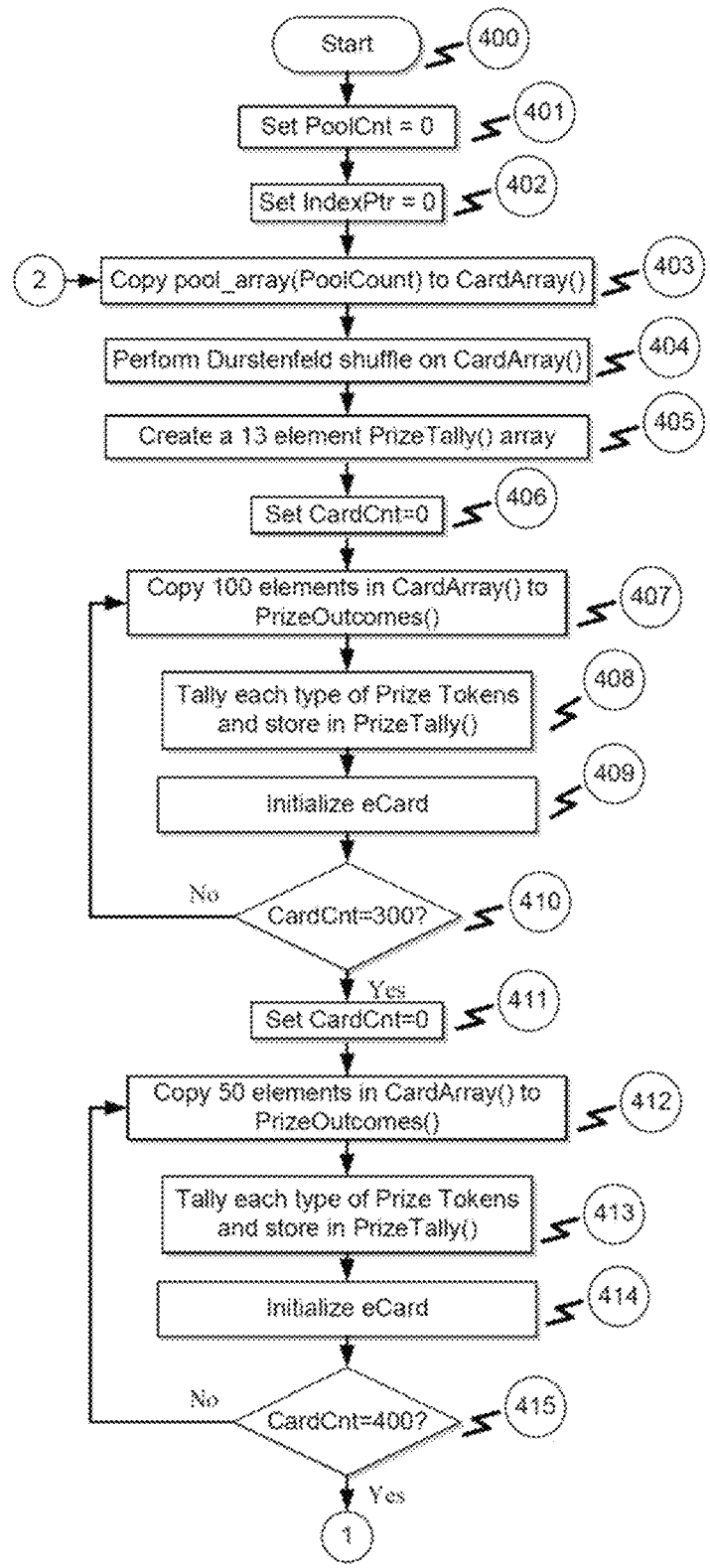
FIG. 8(a) depicts a first part of a flowchart of generating game batches according to an embodiment of the present invention.
Figure 8B:
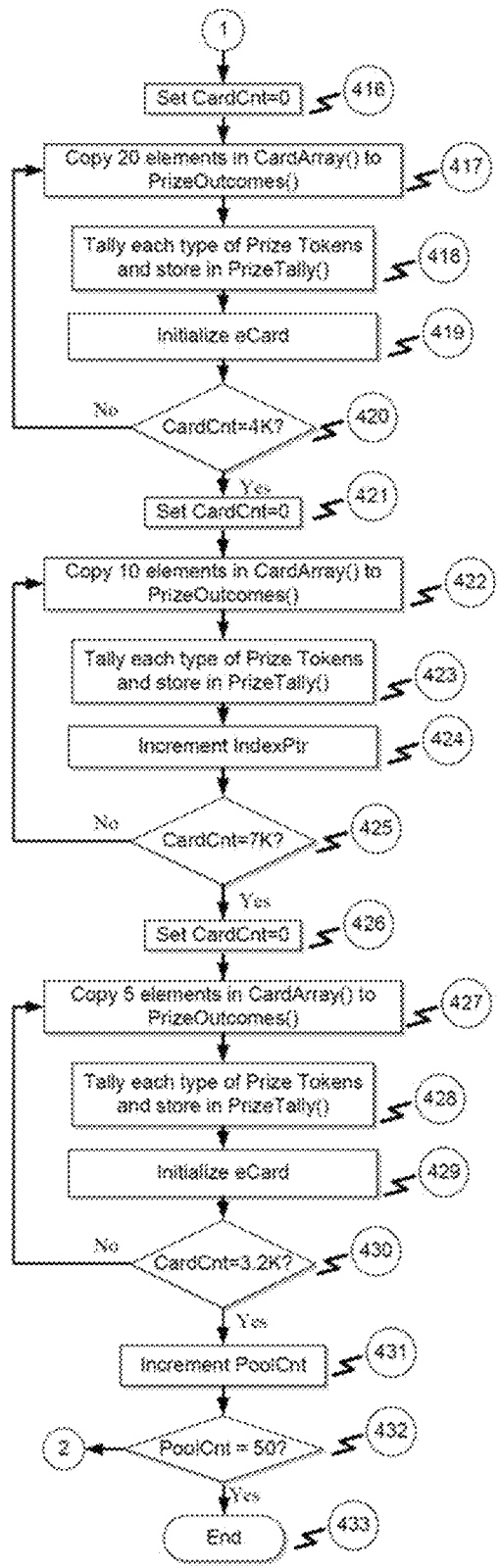
FIG. 8(b) depicts a second part of a flowchart of generating game batches according to an embodiment of the present invention.

FIGS. 8(a) and 8(b) show the process flowchart for the generation of the eCard batches. The process starts at step 400 in FIG. 8(a). Variables PoolCnt and IndexPtr are initialized in steps 401 and 402, respectively. The pool_array (PoolCount) is copied to a temporary working variable called CardArray( ) in step 403. A Durstenfeld shuffle is performed on CardArray( ) in step 404, where the Durstenfeld Shuffle is a nonlimiting example of a randomization approach. In step 407, one hundred elements are copied from CardArray( ) to PrizeOutcomes( ). The number one hundred represents the number of games associated with the three hundred eCards per prize pool with a value of two hundred. A thirteen element array called PrizeTally( ) is created in step 405 to contain the count of each prize tier associated with this eCard batch. In step 408, the process cycles through PrizeOutcomes( ) one element at a time incrementing the associated PrizeTally( ) element corresponding to the token # stored in the PrizeOutcomes( ) element. When all counts are tallied, the process continues at step 409 to call the function to initialize the eCard. The program continues at step 410 to determine if three hundred eCards have been initialized with one hundred outcomes. If no, the program increments the CardCnt variable by one (not shown) before returning to step 407; otherwise the program resets the CardCnt variable to zero in step 411. If three hundred eCards have been initialized, the process copies the next fifty elements in CardArray( ) to the PrizeOutcomes( ) array in step 412. Fifty represents the number of games associated with the eCards with a value of one hundred. The individual outcomes are tallied and stored in PrizeTally( ) array in step 413 before the eCard initialization process is performed in step 414. The process checks if a total of four hundred eCards have been initialized with fifty outcomes in step 415. If not, the process increments CardCnt (not shown) before looping to step 412.

Otherwise, the process continues to step 416 in FIG. 8(*b*) to reset the CardCnt variable to zero. The process copies the next twenty elements in CardArray( ) to the PrizeOutcomes( ) array in step 417. Twenty represents the number of games associated with the eCards with a value of forty. The individual outcomes are tallied and stored in PrizeTally( ) array in step 418 before the eCard initialization process is performed in step 419. The process checks if a total of four thousand eCards have been initialized with twenty outcomes in step 420. If not, the process increments CardCnt (not shown) before looping to step 417. Otherwise the process continues to step 421 to reset the CardCnt variable to zero. The process copies the next ten elements in CardArray( ) to the PrizeOutcomes( ) array in step 422. Ten represents the number of games associated with the eCards with a value of twenty. The individual outcomes are tallied and stored in PrizeTally( ) array in step 423 before the eCard initialization process is performed in step 424. The process checks if a total of seven thousand eCards have been initialized with ten outcomes in step 425. If not, the process increments CardCnt (not shown) before looping to step 422. Otherwise the process continues to step 426 to reset the CardCnt variable to zero. The process copies the next five elements in CardArray( ) to the PrizeOutcomes( ) array in step 427. Five represents the number of games associated with the eCards with a value of ten. The individual outcomes are tallied and stored in PrizeTally( ) array in step 428 before the eCard initialization process is performed in step 429. The process checks if a total of three thousand two hundred eCards have been initialized with ten outcomes in step 430. If not, the process increments CardCnt (not shown) before looping to step 427. In step 431, the process increments the variable PoolCnt before checking to see if it is equal to fifty in step 432. If all fifty prize pools have been processed (batched) the process ends in step 433, otherwise the program loops to step 403 in FIG. 8(*a*) to repeat the "batching" process for the next prize pool.

Figure 9:
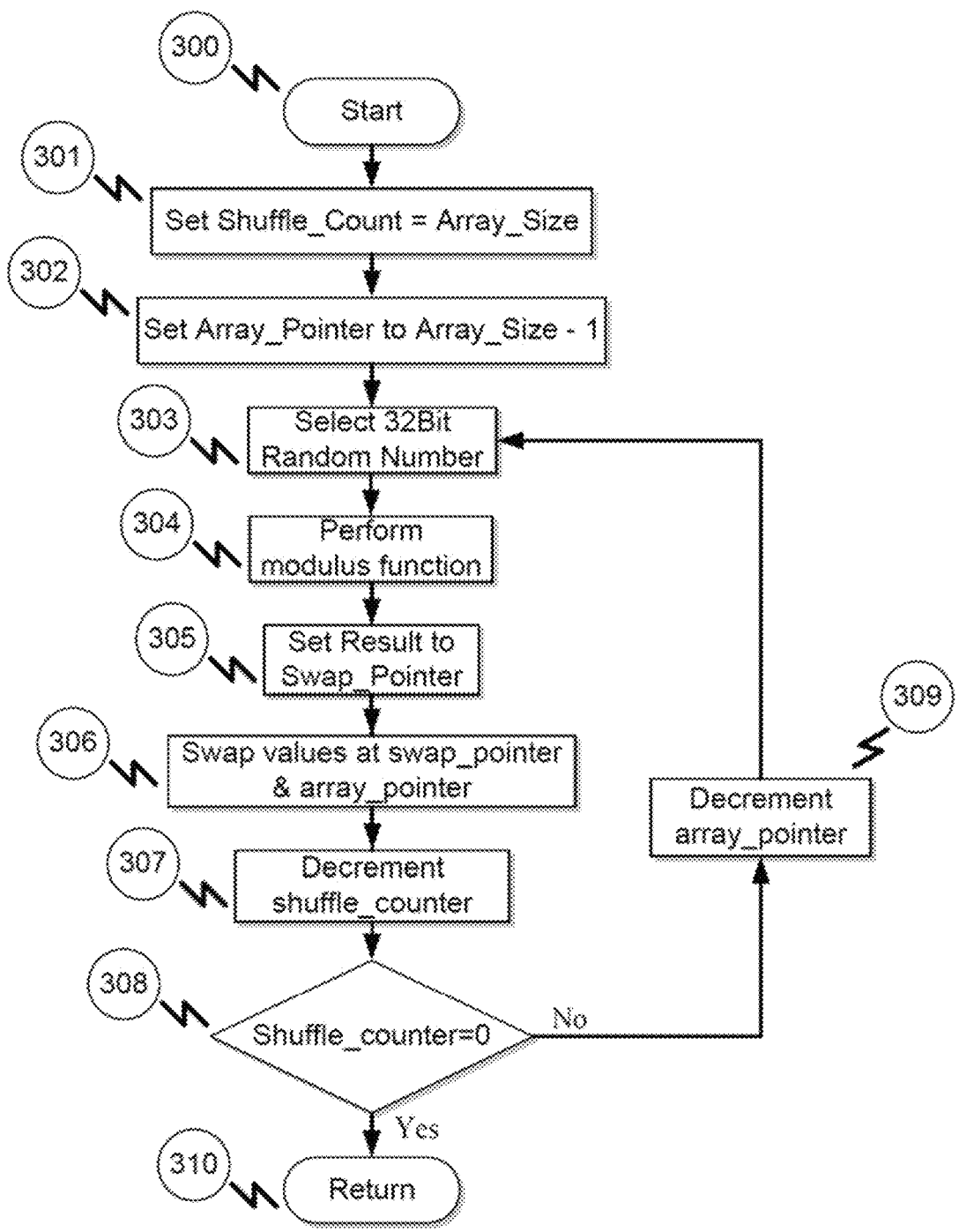
FIG. 9 depicts a flowchart of a Durstenfeld shuffle function according to an embodiment of the present invention.

FIG. 9 shows a process flowchart for the Durstenfeld Shuffle function used to randomize the various data arrays. The process enters the function through the "Start" block in step 300. Since numerous sequences of routines utilize this function, the Shuffle_Count variable must be set to equal the Array_Size in step 301 and the Array_Pointer variable is set to Array_Size−1 in step 302. Once a 32-Bit true random number is generated in step 303, a modulus function is performed in step 304 to ensure the random number generated is within the range of 0 to the Array_Pointer. The result of the modulus function is set to the Swap_Pointer in step 305 and the values in the array stored at Array_Pointer and Swap_Pointer are transposed in step 306. The variable shuffle_count is decremented by one in step 307 and checked to see if it is equal to zero in step 308. If shuffle_count is not equal to zero, there are more elements to shuffle so Array_Pointer is decremented by one in step 309 and the process repeats from the selection of the 32-bit number in step 303. Once shuffle_count equals zero, the shuffle of the array has been completed and the function can return to the calling routine in step 310.

There are many ways to shuffle data including but not limited to the Fisher and Yates' method, Durstenfeld shuffle, "inside-out" algorithm, and Sattolo's algorithm. However, the Durstenfeld shuffle is one of the most effective algorithms for shuffling. One of the advantages of performing a Durstenfeld shuffle is the speed at which it performs. It requires a decrementing pointer that reduces the size of the swap field. A random number generator is used to select a pair of swap pointers to perform a single swap. As the swap field is reduced, a modulus is applied to the random numbers. In order to achieve optimal shuffle results, a true random number (hardware) should be used and truncation bias must be accounted for when applying a modulus function to the random number outcome.

Figure 10:
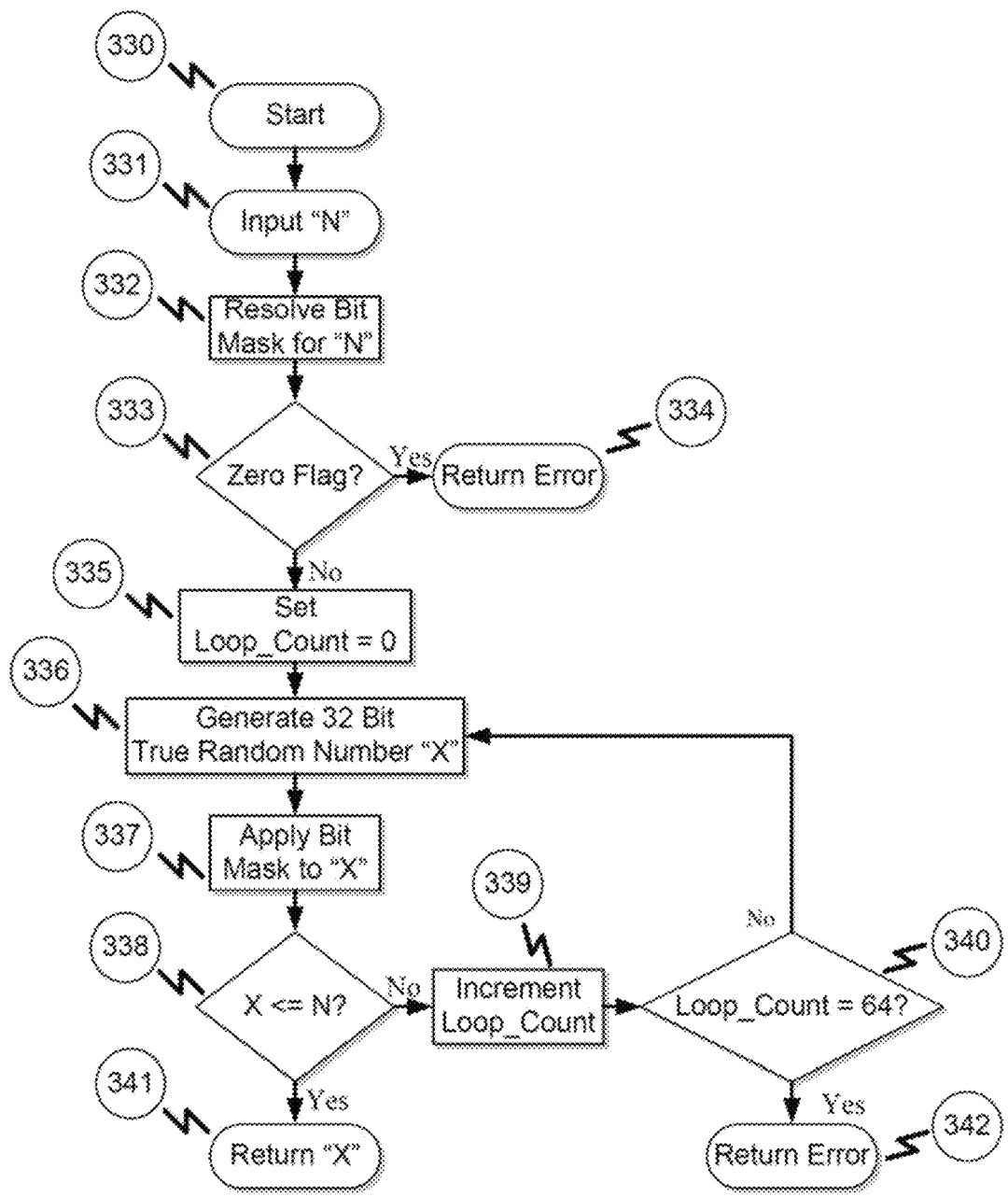
FIG. 10 depicts a flowchart of a true random number generator with modulus according to an embodiment of the present invention.

FIG. 10 is a flowchart for the process of generating a true random number between the values of 0 and "N". This flowchart produces the random numbers, which can later be "shuffled" into further random order utilizing the Durstenfeld Shuffle method. The term "true" indicates that some physical source of noise or random behavior is being measured and an unsigned 32-bit digital number is produced. Some examples of physical random sources are nuclear decay of a radioactive material, white noise voltages produced by a resistor at a specific temperature, randomly phased oscillators being sampled, or semiconductor "shot" noise. The key attribute of the various "noise" sources is that they are non-deterministic in terms of behavior and can only be described on a statistical basis. Usually the physical noise source is "whitened" using software to decorrelate sample values. By example, if left as an unsigned 32-bit integer, the random values would vary from 0 to 4,294,967,296.

When targeting specific probabilities, a modulus function is used to set the upper limit on the random outcome, by example 1 in 100. A modulus of 100 applied to the 32-bit raw random number value will produce a random value of 0-99. The modulus function is based on an arithmetic decision function generally expressed as: N/D, remainder R. By example, if N is 10 and D is 8, then R=2. For random number generation, the modulus function introduces "truncation bias" which will affect the statistical outcome. The effect of truncation bias must be compensated for when producing a random integer value between 0 and "N".

The process starts in step 330. In step 331 the function of generating a 32-bit unsigned random number between a value of 0 to "N" starts, where N is an input variable defining the upper limit of the random number return. Step 332 determines an "ANDing" logical bit mask to be applied to the modulus "N" to correct for truncation bias, to be described further in FIG. 12. Step 333 traps an error whereby, the modulus is 0 and returns to the calling function at step 334.

Step 335 starts the process of requesting an unsigned 32-bit hardware generated random number. Step 336 executes a suitable function to access the true random number generator. Step 337 applies the truncation correction bit mask. Step 338 determines if the random number exceeds the modulus limit defined by the bit mask.

If the random number is within the limits of the bit mask, the value is returned at step 341. If the random number exceeds the bit mask limit, the loop_count is incremented in step 339 and the loop_count limit is checked in step 340. If loop_count is exceeded, then an error is returned in step 342, otherwise a new random number is selected by returning to step 336.

Figure 11:
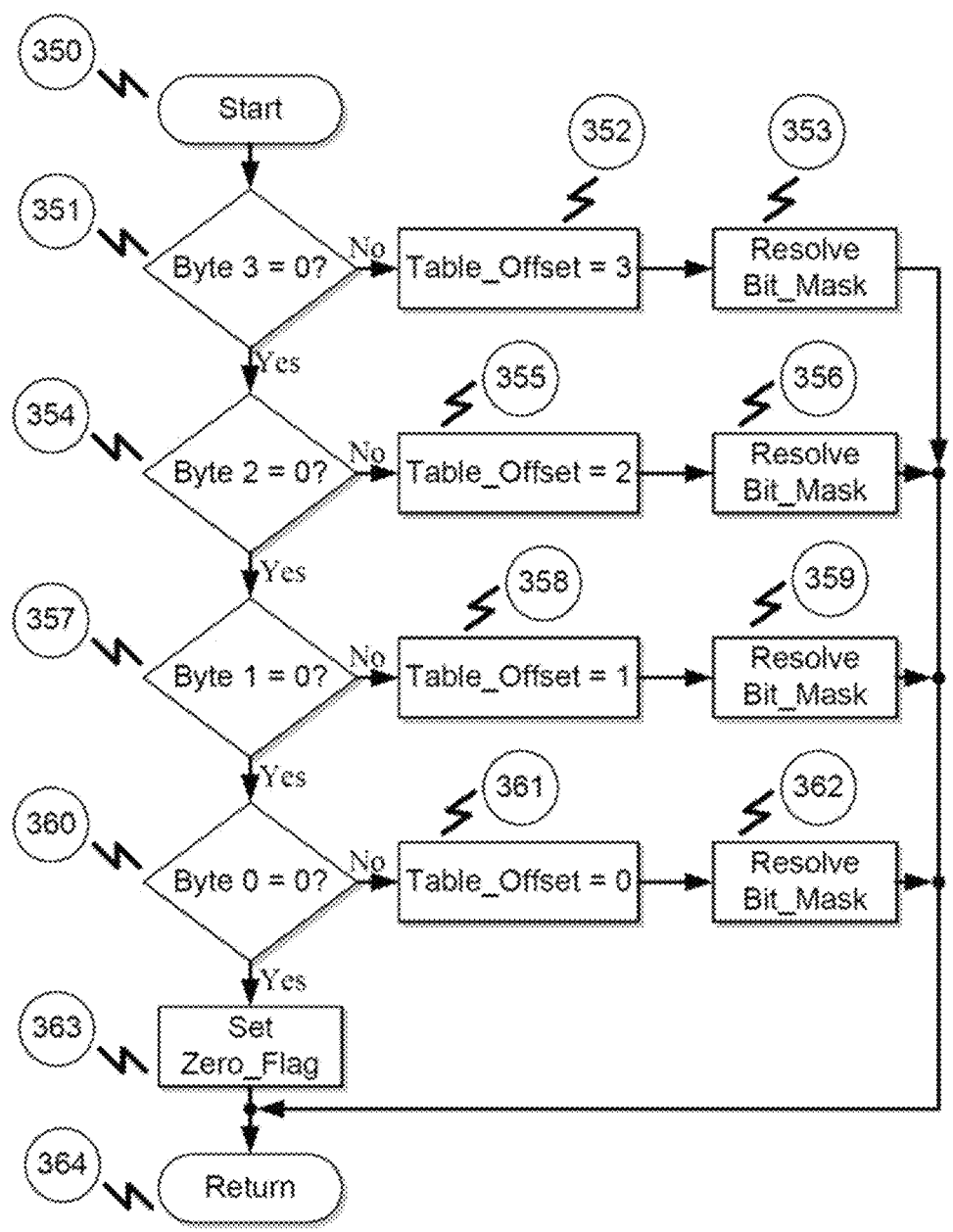
FIG. 11 depicts a flowchart of a modulus bit mask function according to an embodiment of the present invention.

FIG. 11 provides details on creating a modulus bit mask in flowchart form. The modulus value is in a 32-bit unsigned format, which can be broken into four 8-bit groups (bytes). Each byte of the modulus is checked for a non-zero value in steps 351, 354, 357, 360. If found, a Table_Offset variable is set accordingly in steps 352, 355, 358, 361 and a bit mask will be resolved in respective steps 353, 356, 359, 362. The function exits in step 364. If all four groups are set to 0, then the modulus is set to 0, which is an illegal value. If a 0 modulus is detected, an error flag is set (zero_flag) in step 363 and the function exits 364.

Figure 12:
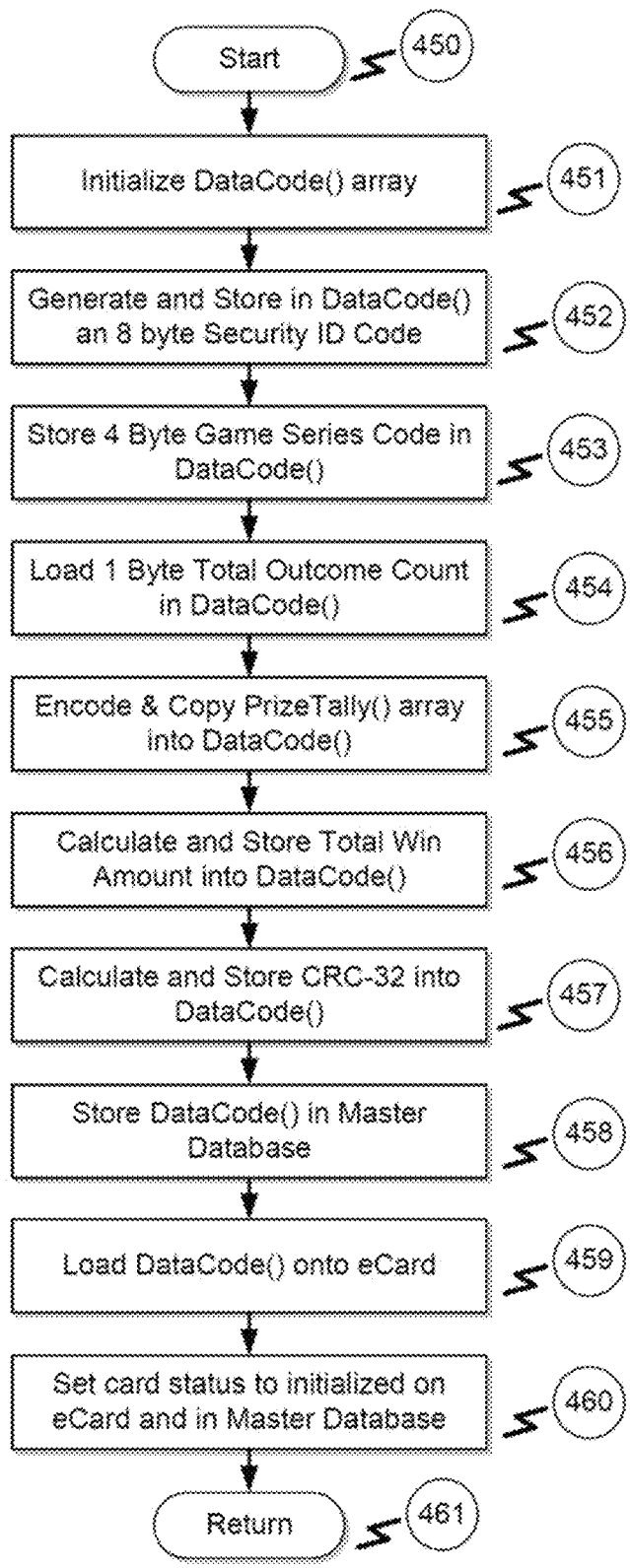
FIG. 12 depicts a flowchart of a process to initialize the ePullTab card.

FIG. 12 is a flowchart depicting the routine for initializing the eCards. The process enters at step 450 and initializes an array called DataCode( ) in step 451. The process generates an 8 byte Security ID Code and stores in the DataCode( ) array in step 452. In step 453, the process stores the 4 byte game series code in DataCode before loading the 1 byte value indicating the number of outcomes stored on the eCard in step 454. The process then encodes and copies the thirteen element PrizeTally( ) array into DataCode( ) in step 455. In step 456, the process calculates and stores the total winning amount associated with the batch of game outcomes into the DataCode( ). The process calculates and stores a CRC-32 checksum into the DataCode( ) array in step 457. For eCard verification purposes, the DataCode( ) array is stored in the Master Database in step 458 before being loaded onto the eCard in step 459. If the process is successful, the status bit on the eCard and in the Master database is set in step 460. The process exits and returns to the calling program in step 461.

The system and method for a multigame eCard as described herein utilizes a security method and system defined by embodiments of the invention found in U.S. Pat. No. 8,870,084 ('084 patent), which is herein incorporated by reference in its entirety. The following is a summary of the '084 invention operating as a security system and method for a multigame eCard and system.

Figure 13:
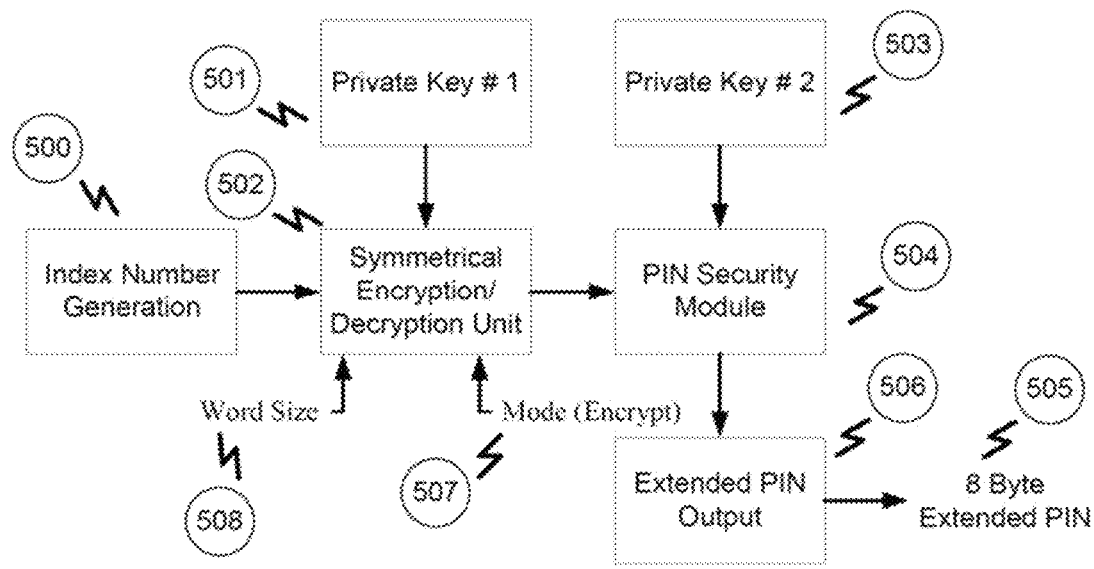
FIG. 13 depicts a flowchart of a security identification code generation system according to an embodiment of the present invention.
Figure 14:
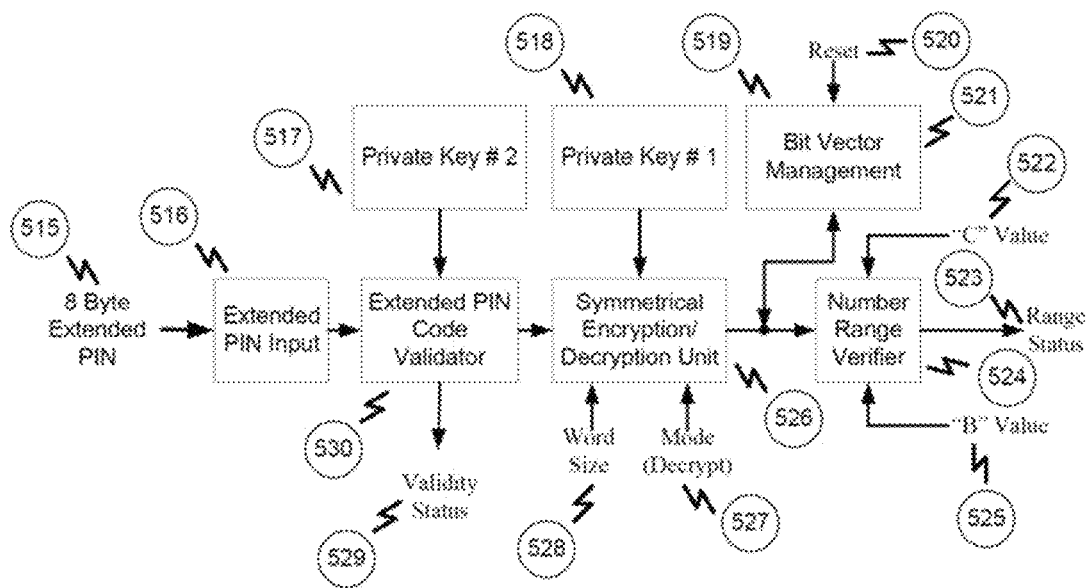
FIG. 14 depicts a flowchart of a security identification code validation system according to an embodiment of the present invention.

FIGS. 13 and 14 illustrate a security key generation and validation system according to the embodiment of the present invention. The security generation process includes the following: An index number generator 500 is connected to a symmetrical encryption/decryption unit 502. Private key #1 501 selects the index number security ordered pairs generated by the symmetrical encryption/decryption unit 502. Also, acting as control elements to the encryption/decryption unit are the word size control 508 and mode 507 inputs. The word size 508 control input defines the number of bits used as a digital word for both the input and output ports of the symmetrical encryption/decryption unit 502. The mode input 507 identifies the mode of operation as encryption. The input of the key security module 504 is connected to the output of the symmetrical encryption/decryption unit 502. Private key #2 503 controls the generation of a security code that is concatenated with the input of the key security module 504 and placed into the extended key output buffer 506. The output of extended key output 506 is an 8-byte extended key 505.

The security validation process starts with the contents of extended key output buffer 506 (e.g. the 8-byte extended key 515) being placed into the extended key input buffer 516. This is done by any means, such as a wired or wireless communications path, disk file, or human keyboard input, as nonlimiting examples. The contents of the extended key input buffer 516 act as an input to the extended key code validator 530. The extended key code validator 530 produces a validity status 529, indicating if the key is valid. The validity status of the extended key code validator 530 will indicate if the content of the extended key input buffer 516 were produced by a key generator whereby private key #2 517 matches that of private key #2 503. If the validity status is affirmative, a process sequencer (not shown) will proceed to convert the extended key to a number index value by way of the symmetrical encryption/decryption unit 526. The symmetrical encryption/decryption unit has two control inputs, word size 528 and mode 527. Word size 528 defines the number of bits that are operated upon. Mode 527 is a single bit control defining encryption or decryption mode. The operation and functionality of the symmetrical encryption/decryption unit 526 is identical to that of 502 except that the mode is set to decryption. If the validity status is negative, indicating the extended key was not generated by an authorized key generator as defined by this invention or not utilizing the same private key #2 517, 503, the process sequencer (not shown) will abort any further processing and take appropriate actions to indicate the invalidity of the processed contents of the extended key input buffer 516.

The output of the symmetrical encryption/decryption unit 526 is connected to both the input of a number range verifier 524 and a bit vector management process 521. The number range verification 524 generates a range status 523, which indicates whether the number is within an upper 522 and lower bound 525. The process sequencer may optionally use the index value output from the symmetrical encryption/decryption unit 526 to verify if a bit is set in a bit vector (not shown) located within the bit vector management process. If the process sequencer determines the bit is set, it would indicate that the key code in the extended key input buffer had been processed at a previous time and should abort any further processing of the extended key as well to take appropriate actions to invalidate the extended key input. The number range verifier 524 will determine if the input of the number range verifier 524 is greater than or equal to the "B" input 525 to the number range verifier 524 and less than or equal to the "C" input 522 of the number range verifier 524. The range status 523 of the number range verifier 524 will provide a binary status if the input is within the range of values "B" and "C". The bit vector management process 521 will set a bit within a bit vector (not shown) as specified by the index value output from the symmetrical encryption/decryption unit 526. Setting the bit within the bit vector indicates that the extended key was valid and has been processed.

Symmetric, secret-key, and block encryption/decryption methods (symmetric-key) are defined as a class of algorithms for cryptography that use identical cryptographic keys for both encryption of plaintext and decryption of ciphertext. In practice, the keys represent a shared secret. Other terms for symmetric-key encryption are secret-key, single-key, shared-key, one-key, and private-key encryption.

Symmetric-key cryptography transforms (scrambles) a message into something resembling random noise. The key determines the precise transformation. Mathematically, a cryptographic algorithm is a function that maps a message onto a ciphertext (an encrypted message). By using keys, it is possible to encrypt many different messages using one particular cryptographic algorithm with a different outcome for each key.

Some cryptographic algorithms that operate on fixed word lengths are referred to as block ciphers. Block (word) sizes of 32, 64, and 256 bits are commonly used. Some nonlimiting examples of popular and well-respected symmetric encryption/decryption algorithms are Twofish, Serpent, AES (Rijndael), Blowfish, CAST5, RC4, DES, Triple-DES, and IDEA.

Figure 15:
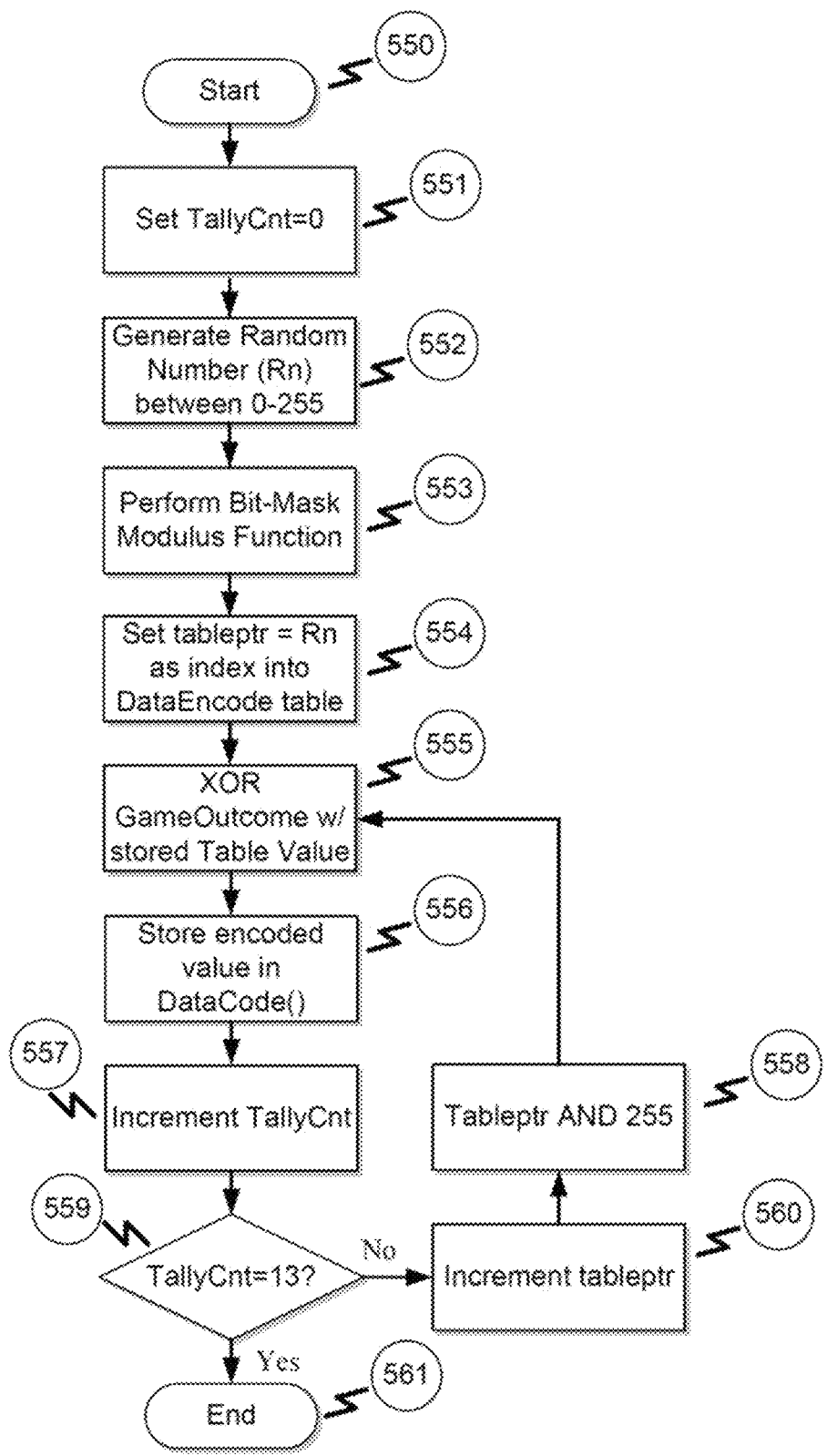
FIG. 15 depicts a flowchart of a game outcome encoding function according to an embodiment of the present invention.

FIG. 15 is a flowchart for the routine which encodes the prize token tally counts stored in the PrizeTally( ) arrays. The routine enters at 550. The variable TallyCnt is initialized to zero in step 551. In step 552 a random number between 0-255 is generated. The bit mask modulus function is called in step 553 to eliminate truncation bias. The random number is assigned to the variable tableptr in step 554 as the index into a 256 byte table stored in memory. The value stored in the table at tableptr is retrieved and exclusive ORed with the value at location GameCnt in the PrizeTally( ) array in step 555. The encoded value is stored in the DataCode array in step 556. The process of "exclusive ORing" obscures the value of the tally count of the tokenized predetermined game outcomes with random data. This is equivalent to adding an opaque "scratch off" layer to a conventional scratch off game ticket. To retrieve the original token value, the "obscured" taken value is exclusive ORed again with the same random value. The variable TallyCnt is incremented in step 557 and compared to thirteen in step 559. Thirteen is the number of prize tiers (tally counts) associated with the ePullTab game. If the variable equals thirteen, indicating all tally counts have been encoded, the routine ends and returns to the calling program in step 561. If the variable does not equal 13, tableptr is incremented in step 560. The variable is then AND'd with 255, producing a value between 0-255, in step 558, before looping back to step 555.

The prize tally count encoding process described above and in FIG. 15 provides a randomizing process to obscure the actual token values. It should be noted that at step 552 a software based random number is used. A nonlimiting example is the linear congruential random number generator: 13*X+1. This simple random number generator when restricted to 8 bit unsigned numbers will appear to produce random number values between 0 and 255. No two numbers will be repeated until the cycle starts over. When the game parameters are downloaded from the host during the eCard "pairing" process a "seed" 8 bit value is identified as a starting value for the software based random number generator.

Figure 16:
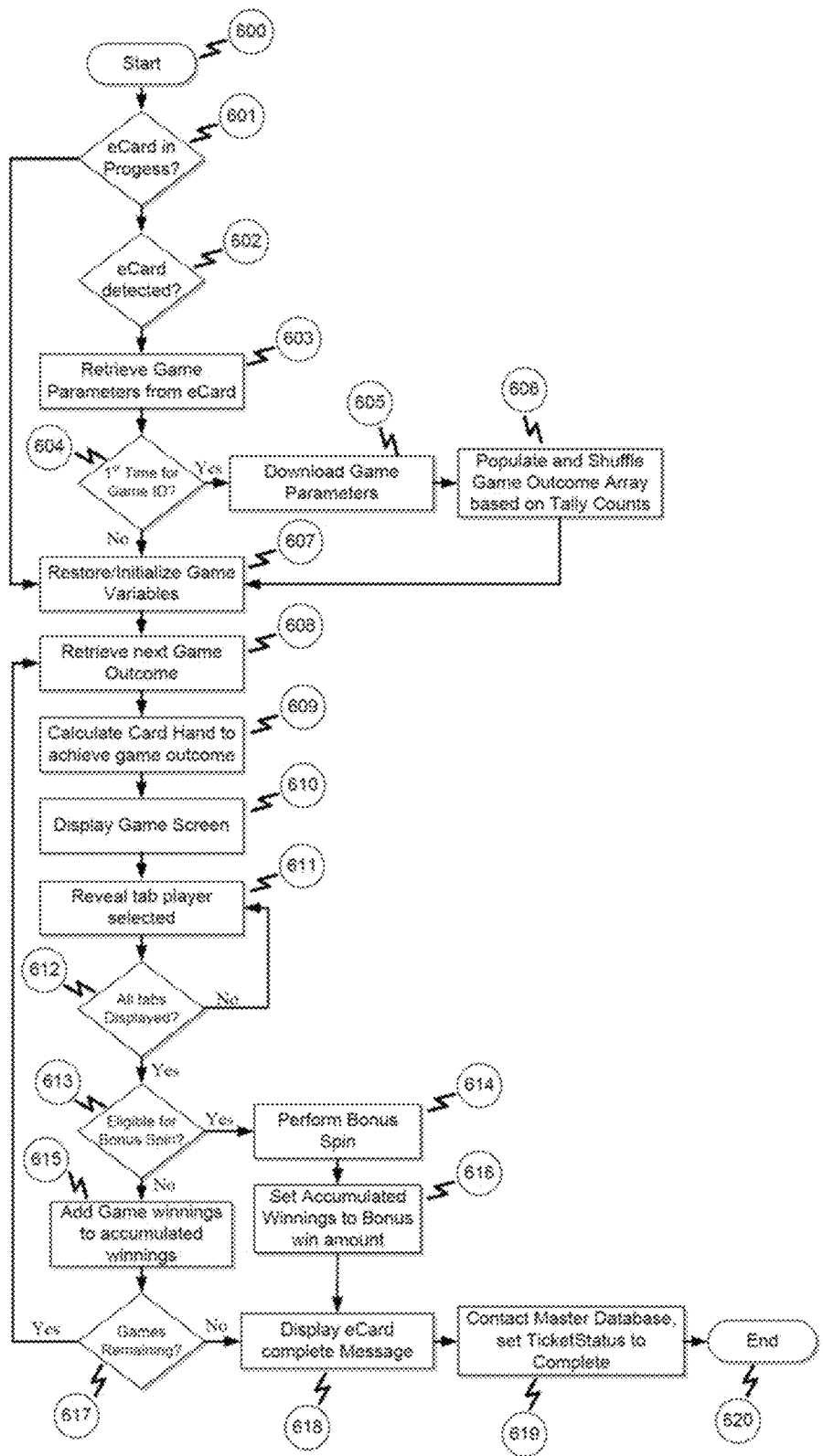
FIG. 16 is a flowchart of the smart device application.

FIG. 16 is a top-level flowchart of the application for a smart device. The program begins at step 600 and checks to see if there are game outcomes left from a previously scanned ticket in step 601. If there is a game in progress, the program skips forward to step 607. Otherwise, the program waits for the player to begin the "pairing" process between the eCard and the smart device 602. The program retrieves and decodes the information stored in the electronic memory on the eCard in step 603.

In step 604, the software application determines, based on the game series code, if this is the first time this game variation has been accessed on this device. If yes, the software application branches off to the routine to download game parameters from the applicable online resource in step 605. Once game parameters have been downloaded, the application in step 606 creates, populates, and then shuffles a GameOutcome Array based on the tally counts stored on the eCard.

In step 607, the software application restores (if a previous game was in progress) or initializes (if a new eCard) various game variables. The software application then retrieves the next (or first) game outcome to be displayed in step 608. Based on the game outcome and game information downloaded, the software application in step 609 calculates the appropriate game screen to display to achieve the proper game outcome. The software application then displays the game screen in step 610, with all tabs "covered". The software application waits for the player to select a tab to display (not shown) before revealing the selected tab in step 611. If all tabs have not been displayed in step 612, the software application loops back to step 611. Otherwise, the software application continues to step 613 where the application determines if the game outcome warrants a bonus spin. If a bonus spin is available, the application performs the bonus spin in step 614. As per the game rules, the eCard accumulated winning amount is set to equal the amount won in the bonus spin in step 616 before proceeding to step 618. If a bonus spin is not available in step 613, the application adds the winning amount for the game, if any, to the accumulated winnings thus far earned for the eCard in step 615. The games remaining count is decremented (not shown) and the software application determines if there are any remaining outcomes to display at step 617. If yes, the program waits for the player to initiate a new hand (not shown) before looping back to step 608, otherwise it continues to step 618 and displays a game over message. The software application then connects via the internet to the master database to change the status of the eCard to complete in step 619. The program ends at step 620.

Figure 17:
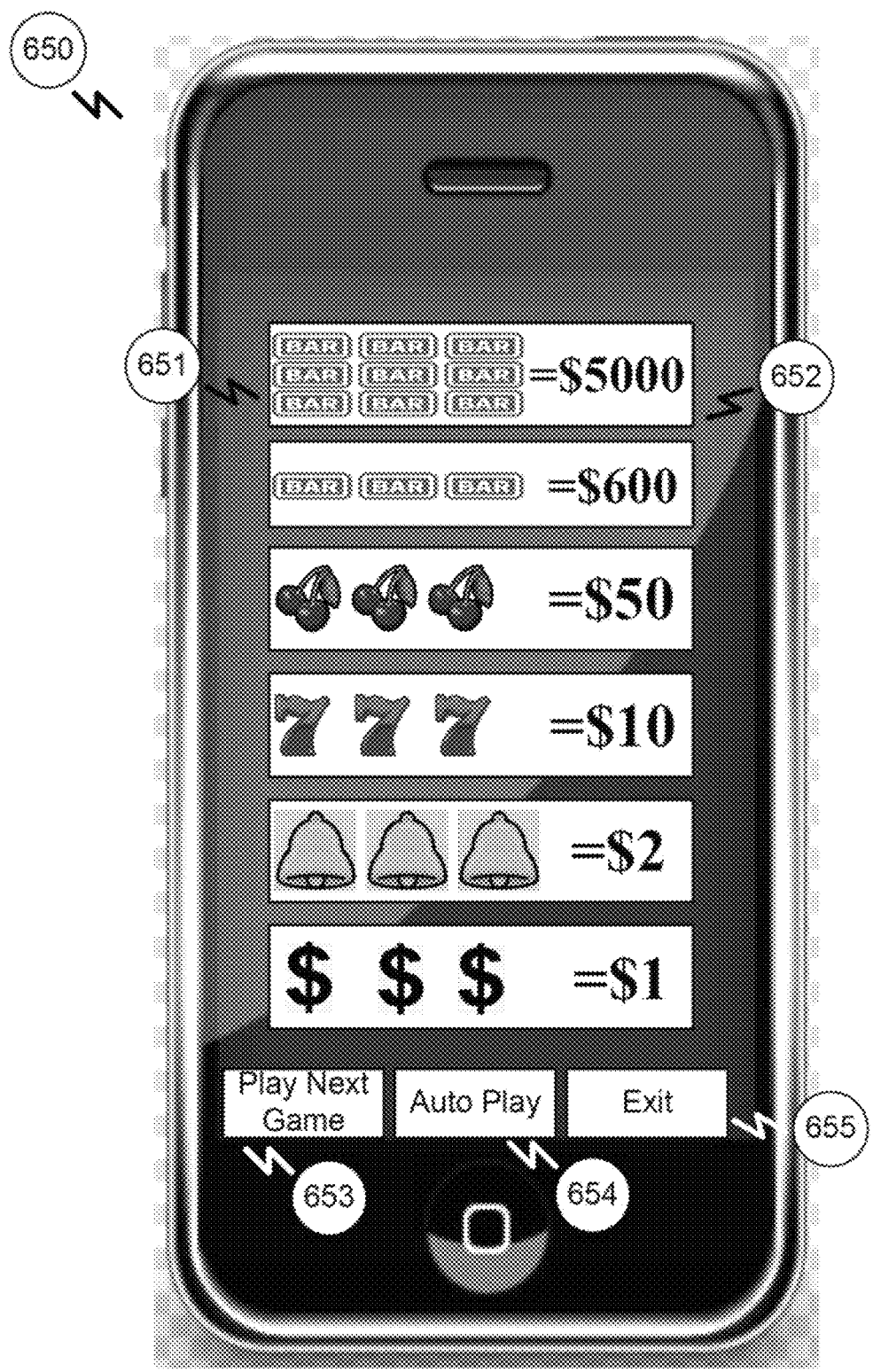
FIG. 17 depicts an example of a screenshot of an ePullTab game payout table on a smart device according to an embodiment of the present invention.

FIG. 17 is a pictorial representation of an implementation of a nonlimiting game. The display on the smart device 650 shows the game's payout table and associated winning symbol combinations. It illustrates to the player the three symbols 651 that need to be aligned (in a pattern defined in the game rules) to win the indicated amount 652. According to the game rules all games winning an amount of $600 or $5000 will also be awarded a bonus spin.

Figure 18:
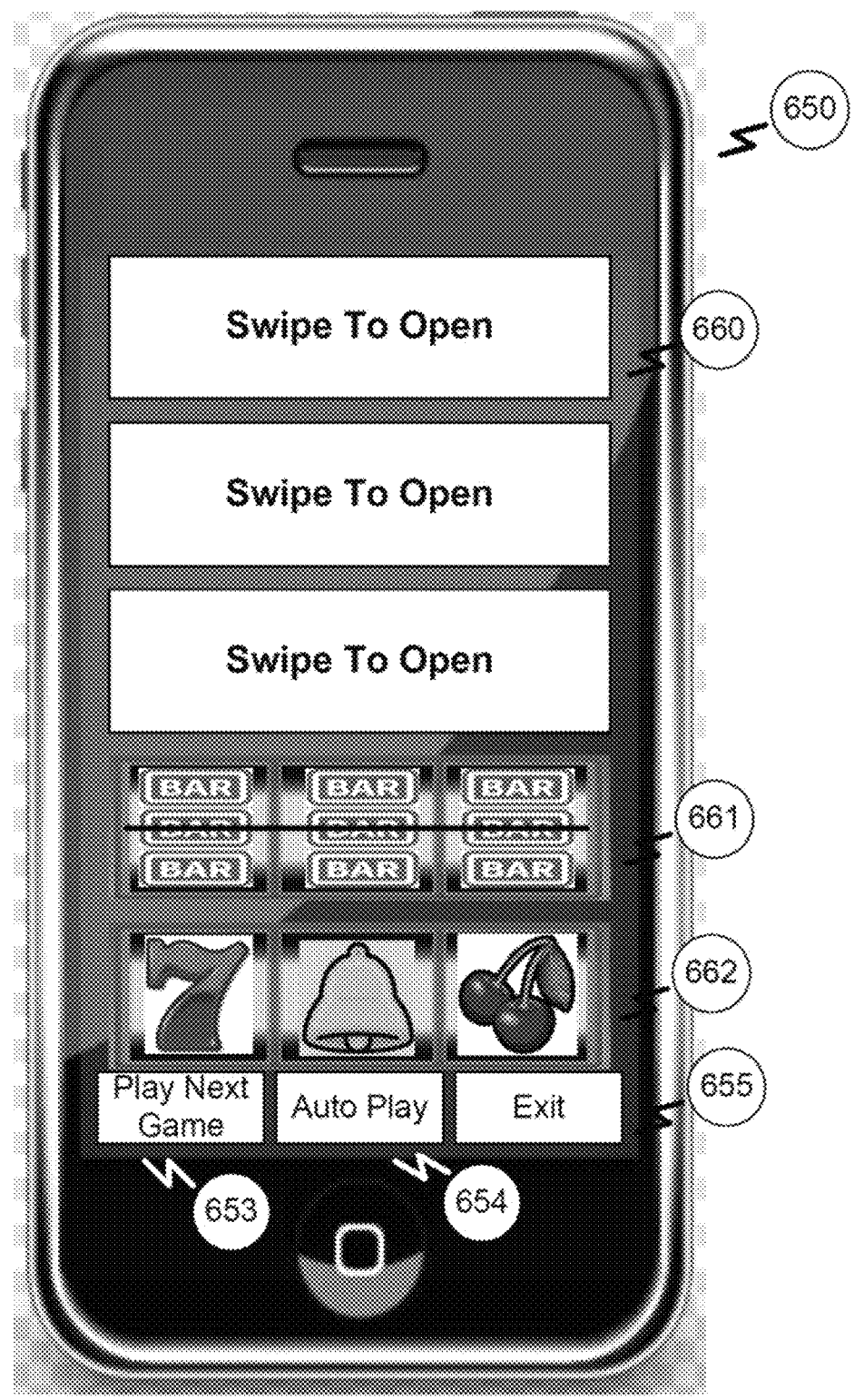
FIG. 18 depicts an example of a screenshot of an ePullTab game in progress on a smart device according to an embodiment of the present invention.

FIG. 18 is a pictorial representation of an implementation of a nonlimiting game in progress. The display on the smart device 650 shows the game screen. On the game screen is the play board 660 which contains the 5 individual "tabs" 660, 661, 662. When the game begins, all 5 tabs are "covered" and are "opened" as the player taps the individual tabs. Also located on the play board is the "auto play" virtual button 654. This can be used by the player to quickly reveal all the remaining tabs in the game. Once all 5 tabs are revealed, the player selects the "play next game" virtual button 653 to display the next hand, if available. If the player wishes to exit the software application and continue at a later time, they can select the "exit" virtual button 655.

Figure 19:
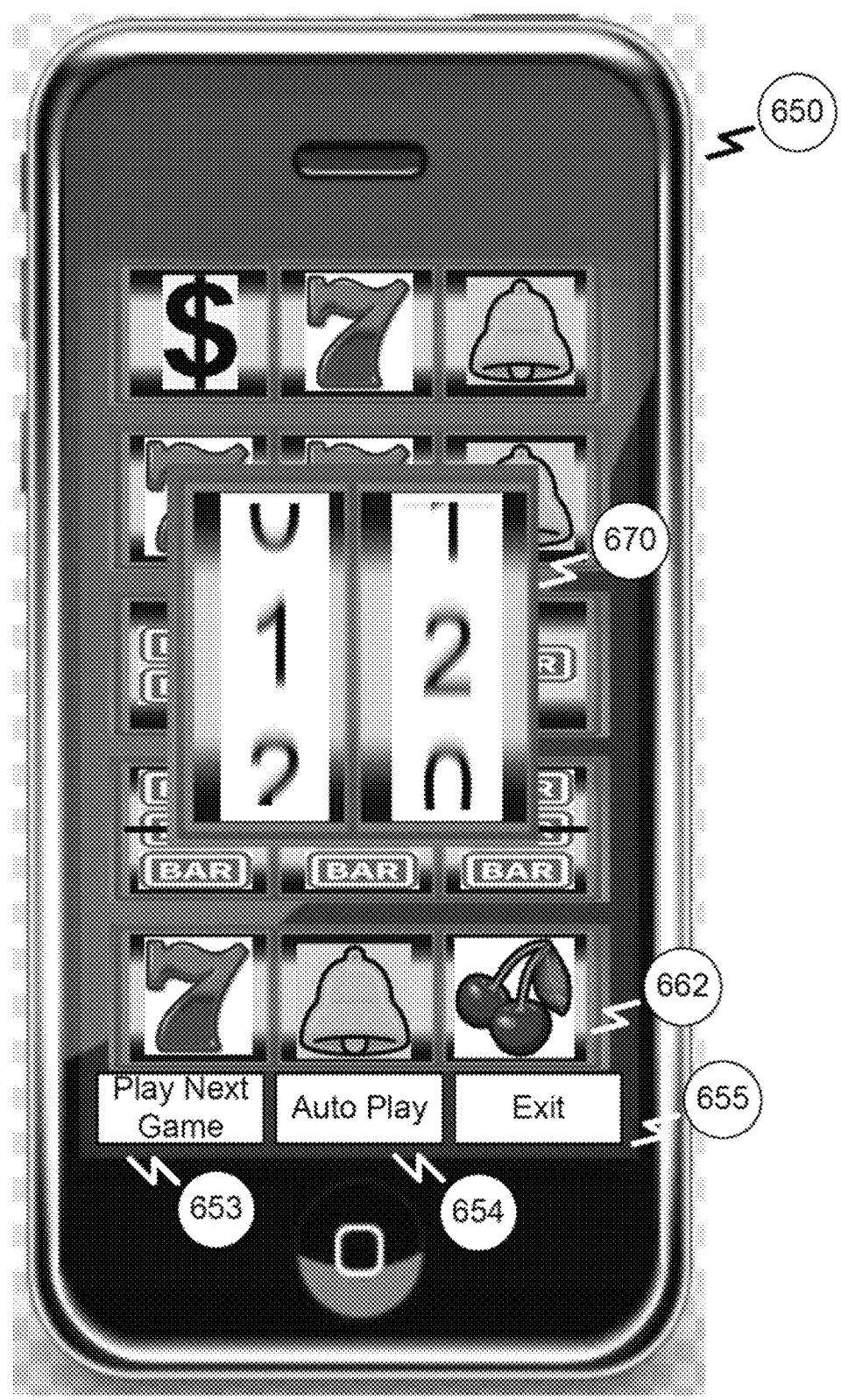
FIG. 19 depicts an example of a screenshot of an ePullTab game bonus spin in progress on a smart device according to an embodiment of the present invention.

FIG. 19 is a pictorial representation of an implementation of a nonlimiting game's bonus spin in progress. The display on the smart device 650 shows the game screen with the bonus spin overlay 670. The overlay emulates the spinning motion of the potential bonus multiplier.

Figure 20:
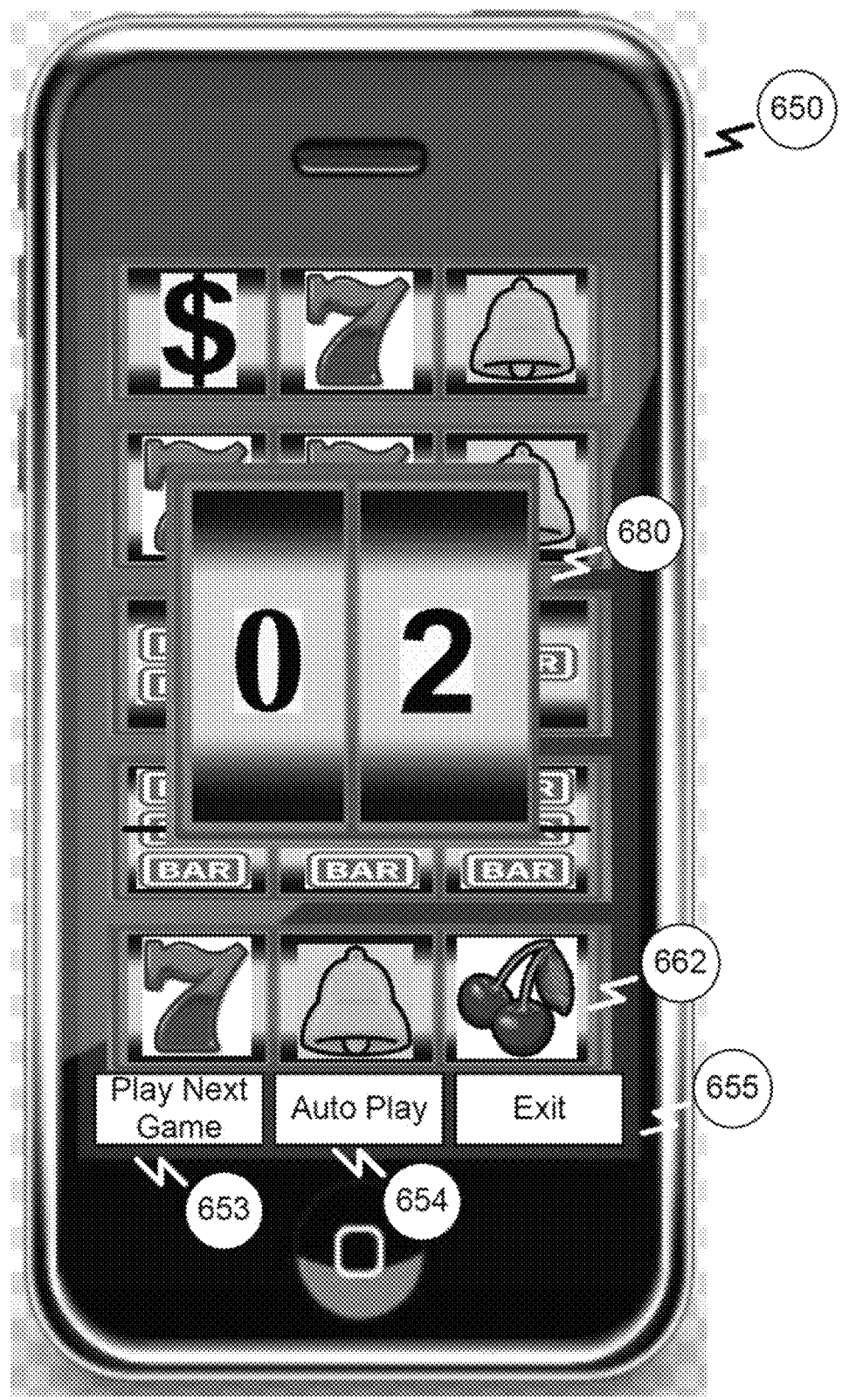
FIG. 20 depicts an example of a screenshot of a completed ePullTab game bonus spin on a smart device according to an embodiment of the present invention.

FIG. 20 is a pictorial representation of an implementation of a nonlimiting game's bonus spin result. The display on the smart device 650 shows the game screen with the results of the bonus spin 680. In this example the winning amount would be $10000 indicated by the 3 triple bars (5000 winner) with the line multiplied by the 2× multiplier.

FIGS. 21(*a*) and 21(*b*) represent an example of the rules associated with a predetermined multigame ticket game 700. The rules indicate a game ID number along with the cost to purchase a multigame eCard from an authorized retailer. The play symbols which may appear in the "Game Board" area are defined. Also defined are the available prizes that can be won on a multigame eCard and the total number of game outcomes that will be produced for this game.

How and which prize a player wins is defined next in the rules. There is a table included in the rules that shows in more detail the prizes available to win.

Figure 22:
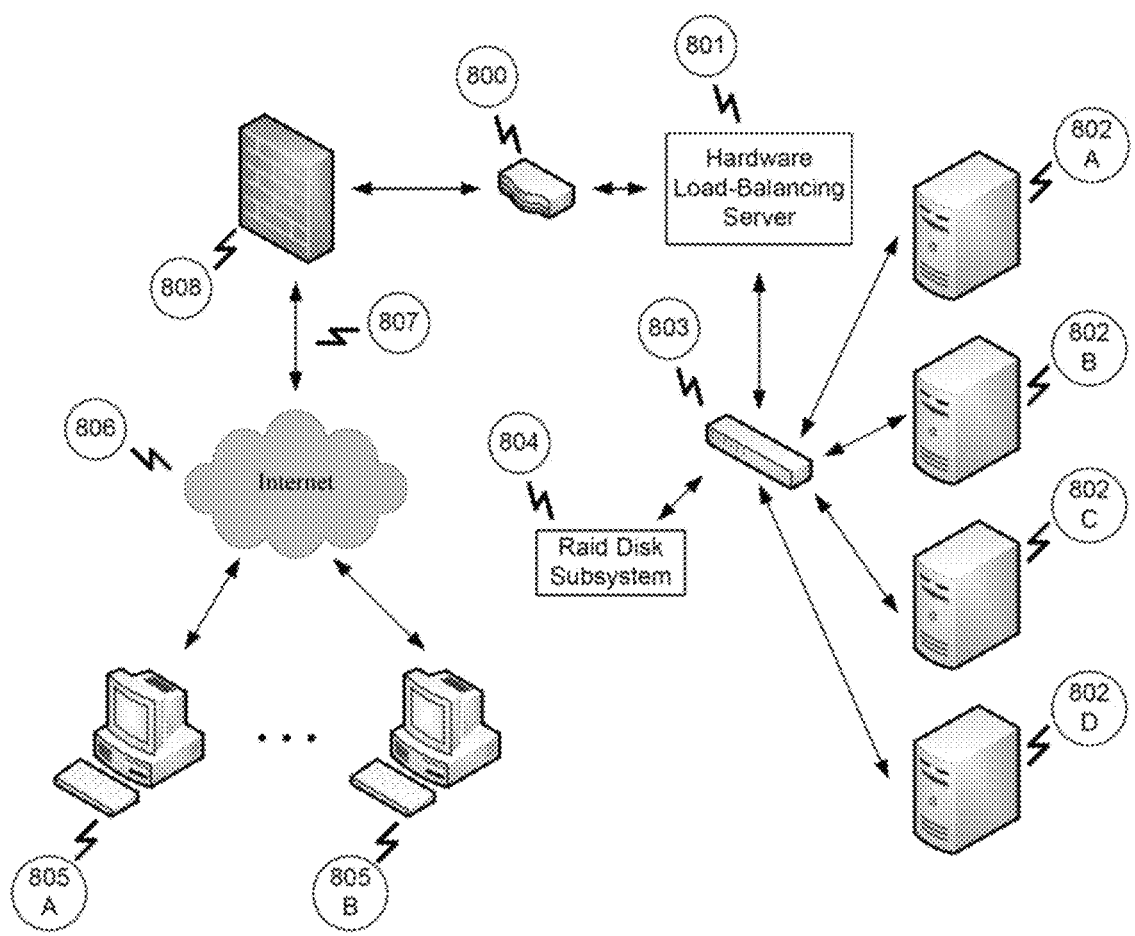
FIG. 22 depicts an example of a server farm according to an embodiment of the present invention.

FIG. 22 depicts an example of a server farm associated with the main lottery office 52. The server farm is illustrated simply for exemplary purposes and is not intended to be limiting. The server farm includes any number of web devices 1 through N, illustrated here as web device 805A and web device 805B. The web devices are connected via the internet 806 to a hardware load-balancing server 801 through a router 800, firewall 808, and TCP/IP 807. The hardware load-balancing server 801 and a raid disk subsystem 804 are connected to any number of webserver computers, illustrated here as computers 802A-D, via a LAN switch 803.

Figure 23:
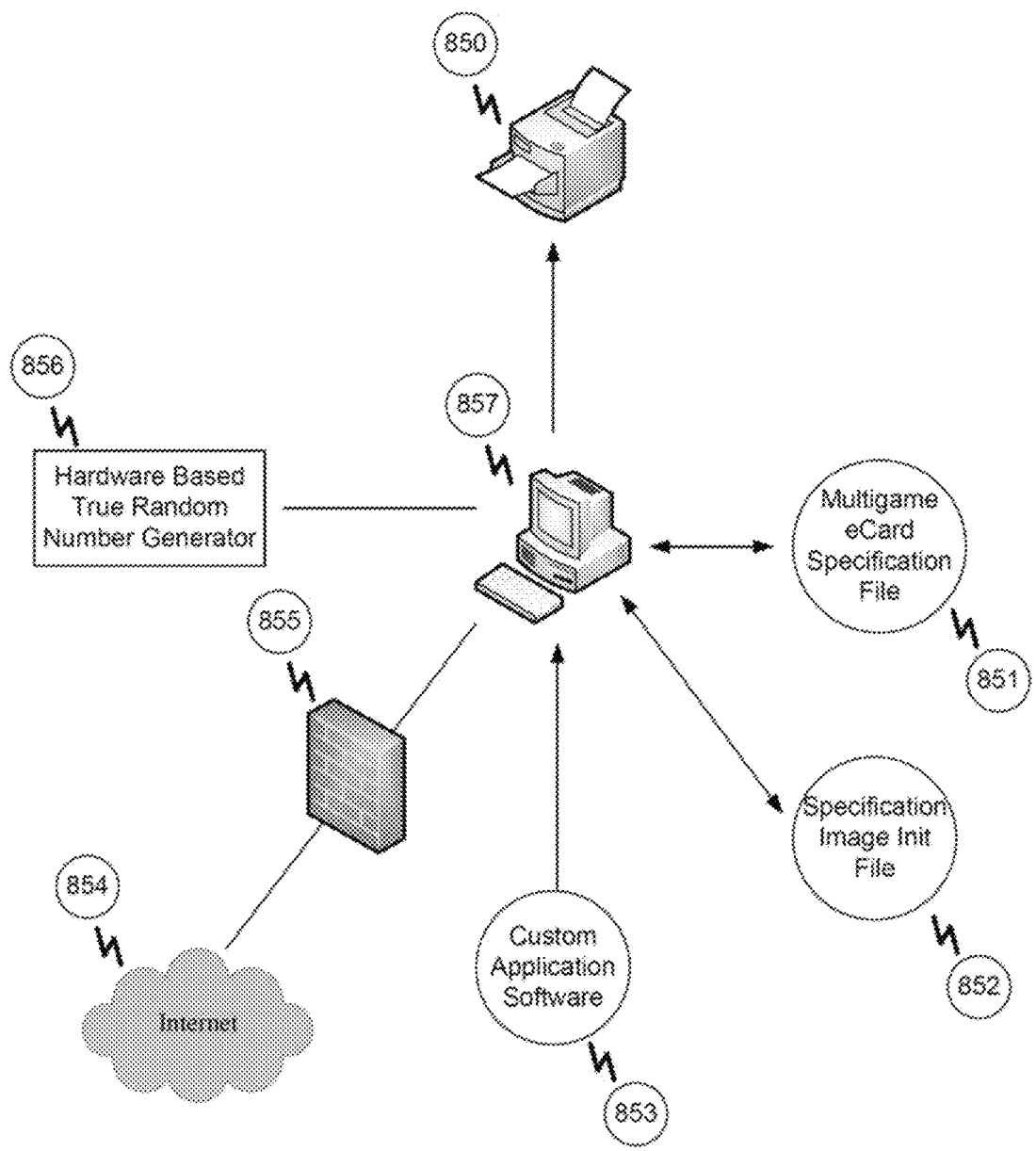
FIG. 23 depicts an example of a specification computer system according to an embodiment of the present invention.

FIG. 23 depicts an example of a specification computer system associated with the game file specification 59. The specification computer system is illustrated simply for exemplary purposes and is not intended to be limiting. A computing system 857 is connected to the Internet 854 through a firewall 855 and is also connected to a printer 850. The computing system 857 includes a hardware based true random number generator 856, as well as a multigame ticket specification file 851, a specification image init file (master database) 852, and custom application software 853.

Figure 24:
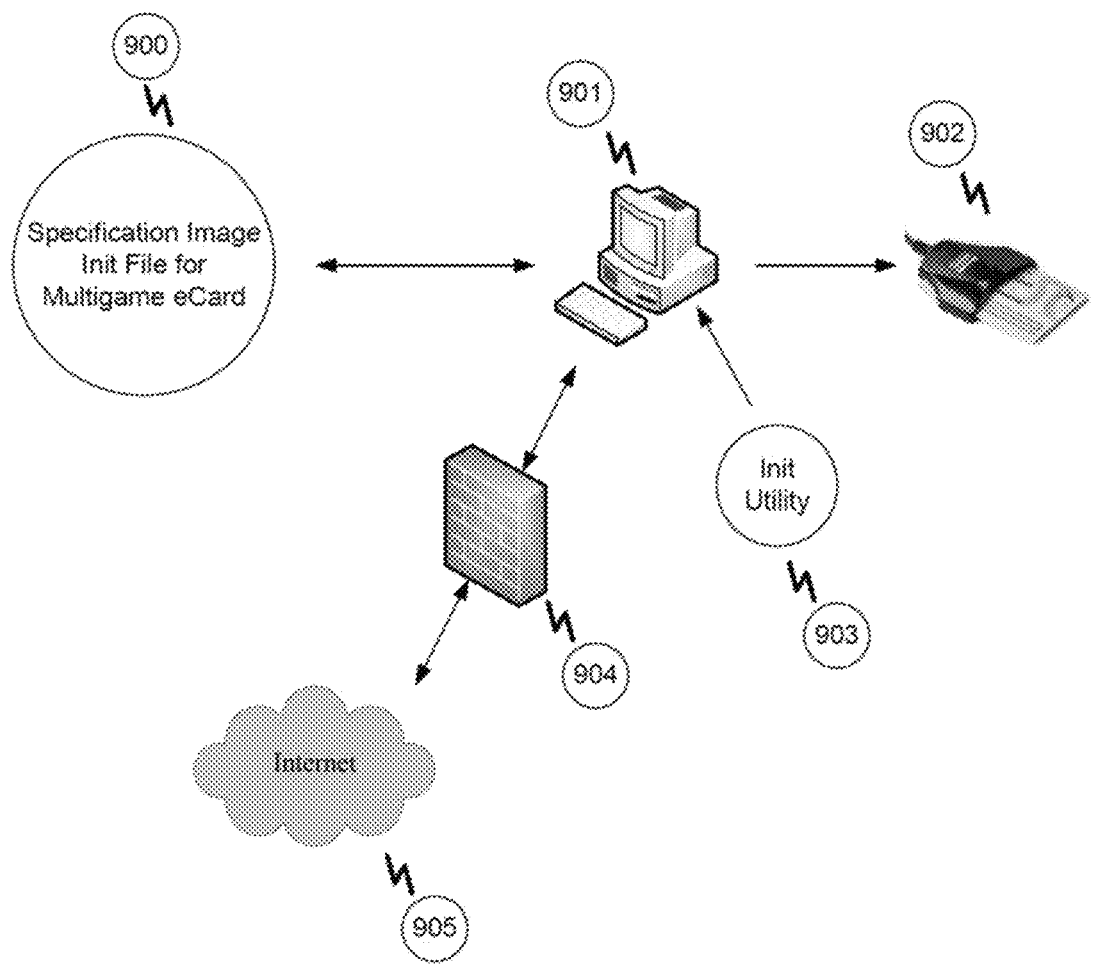
FIG. 24 depicts an example of an eCard Initialization computer subsystem according to an embodiment of the present invention.

FIG. 24 depicts an example of an eCard initialization computer subsystem associated with the eCard manufacturing facility 50. The initialization computer subsystem is illustrated simply for exemplary purposes and is not intended to be limiting. A computing system 901 is connected to the Internet 905 through a firewall 904. The computing system 901 includes an initialization utility 903 for receipt of a specification image init file for multigame eCard initialization 902. The eCard initialization is illustrated as a hardwired eCard reader/writer for exemplary purposes only and is not intended to be limited. eCard initialization may be performed using other communication technology either wired or wireless such as serial, USB, Bluetooth, NFC, etc.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A method for implementing a multigame, the method comprising:
    randomly generating a plurality of game outcomes for the multigame;
    grouping the plurality of game outcomes into a plurality of batches according to a game specification;
    assigning a batch number to each of the plurality of batches;
    defining a number of game outcomes in each batch as a tally count;
    encoding each batch number and each tally count with a security code;
    electronically storing each encoded batch number and each encoded tally count in a respective game card, each game card configured to wirelessly communicate the encoded batch number and encoded tally count to a user computing device; and
    providing a game application for downloading by the user computing device, the application being configured to provide a gaming display on the user computing device to allow for playing the multigame based on the encoded batch number.

2. The method of claim 1, wherein the application is further configured to provide the gaming display on the user computing device to allow for playing the multigame based on the encoded tally count.

3. The method of claim 1, further comprising encoding each batch number with an error detecting code.

4. The method of claim 3, wherein the error detecting code comprises a 32-bit cyclic redundancy check.

5. The method of claim 1, wherein the security code is based on a private security key generation and validation process.

6. The method of claim 1, wherein the security code comprises a private security key that is generated and validated using a symmetric-key process.

7. The method of claim 1, wherein randomly generating the plurality of game outcomes comprises shuffling the plurality of game outcomes.

8. The method of claim 7, wherein the shuffling comprises a Durstenfeld shuffle.

9. The method of claim 7, wherein the shuffling comprises applying a modulus bit mask to the plurality of game outcomes.

10. The method of claim 1, further comprising tokenizing each of the plurality of game batches into a finite word length digital representation.

11. The method of claim 10, further comprising obscuring the tokenized game batches by exclusive ORing with a random number, each random number having the same finite word length as each corresponding game batch token.

12. An electronic game card for playing a multigame, comprising:
    an electronic memory configured to:
        store an encoded batch number corresponding to one of a plurality of batches of randomly generated game outcomes for the multigame according to a game specification; and
        store an encoded tally count defining a number of game outcomes in the respective batch; and
    a device for wireless communication configured to wirelessly communicate the encoded batch number and encoded tally count to a user computing device having a downloaded game application that provides a gaming display to allow for playing the multigame based on the encoded batch number and encoded tally count.

13. The electronic game card of claim 12, wherein the device for wireless communication comprises one of a transmitter and transceiver.

14. The electronic game card of claim 12, wherein the wireless communication comprises one of near field communication (NFC) and Bluetooth communication.

15. The electronic game card of claim 12, wherein the electronic memory does not store the game application.

16. The electronic game card of claim 12, wherein the encoded batch number is encoded with a security code and an error detecting code.

17. The electronic game card of claim 16, wherein the error detecting code comprises a 32-bit cyclic redundancy check.

18. The electronic game card of claim 16, wherein the security code is based on a private security key generation and validation process.

19. The electronic game card of claim 16, wherein the security code comprises a private security key that is generated and validated using a symmetric-key process.

* * * * *